US012052590B2

(12) United States Patent
Murray et al.

(10) Patent No.: US 12,052,590 B2
(45) Date of Patent: Jul. 30, 2024

(54) RADIO LINK MONITORING AND RADIO RESOURCE MANAGEMENT MEASUREMENT PROCEDURES FOR NR-U

(71) Applicant: InterDigital Patent Holdings, Inc., Wilmington, DE (US)

(72) Inventors: Joseph M. Murray, Schwenksville, PA (US); Pascal M. Adjakple, Great Neck, NY (US); Lakshmi R. Iyer, King of Prussia, PA (US); Qing Li, Princeton Junction, NJ (US); Yifan Li, Conshohocken, PA (US); Mohamed Awadin, Plymouth Meeting, PA (US); Allan Y. Tsai, Boonton, NJ (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 660 days.

(21) Appl. No.: 17/265,973

(22) PCT Filed: Aug. 8, 2019

(86) PCT No.: PCT/US2019/045755
§ 371 (c)(1),
(2) Date: Feb. 4, 2021

(87) PCT Pub. No.: WO2020/033726
PCT Pub. Date: Feb. 13, 2020

(65) Prior Publication Data
US 2021/0321277 A1    Oct. 14, 2021

Related U.S. Application Data

(60) Provisional application No. 62/716,020, filed on Aug. 8, 2018.

(51) Int. Cl.
*H04W 24/08* (2009.01)
*H04L 5/00* (2006.01)
(Continued)

(52) U.S. Cl.
CPC ........... *H04W 24/08* (2013.01); *H04L 5/0048* (2013.01); *H04L 41/0677* (2013.01); *H04W 56/001* (2013.01); *H04W 72/23* (2023.01)

(58) Field of Classification Search
CPC ... H04W 24/08; H04W 56/001; H04W 72/23; H04L 5/0048; H04L 41/0677
See application file for complete search history.

(56) References Cited

U.S. PATENT DOCUMENTS

2013/0083675 A1    4/2013    Yamada
2013/0301434 A1    11/2013   Krishnamurthy et al.
(Continued)

FOREIGN PATENT DOCUMENTS

CN    102845003 A    12/2012
CN    104285466 A    1/2015
(Continued)

OTHER PUBLICATIONS

Convida Wireless, "Discussion on Channel Access Indication in NR-U", 3GPP TSG RAN WG1 #93 R1-1807240, May 2018, pp. 5.
(Continued)

*Primary Examiner* — Donald L Mills
(74) *Attorney, Agent, or Firm* — Flaster Greenberg, P.C.

(57) ABSTRACT

Radio resource management measurements for new radio unlicensed are performed that are based on a measurement model where a missed received signal transmission opportunity indicator is provided to higher layers to adapt the measurement functions performed by the radio resource control when a missed received signal transmission opportunity is detected. Radio link monitoring for new radio
(Continued)

unlicensed is performed based on in-sync or out-of-sync indications that are based on the estimated radio link quality in combination with missed radio link monitoring reference signal transmission opportunities.

15 Claims, 15 Drawing Sheets

(51) Int. Cl.
*H04L 41/0677* (2022.01)
*H04W 56/00* (2009.01)
*H04W 72/23* (2023.01)

(56) References Cited

U.S. PATENT DOCUMENTS

| | | | |
|---|---|---|---|
| 2014/0211655 | A1 | 7/2014 | Yoo et al. |
| 2015/0296487 | A1 | 10/2015 | Takeda et al. |
| 2018/0160328 | A1 | 6/2018 | Chendamarai Kannan et al. |
| 2019/0053082 | A1* | 2/2019 | Alriksson ............ H04W 24/08 |
| 2019/0182691 | A1 | 6/2019 | Wang et al. |
| 2019/0200249 | A1* | 6/2019 | Yoon .................. H04L 5/0057 |
| 2020/0336973 | A1* | 10/2020 | Niu ..................... H04B 1/7156 |
| 2020/0359241 | A1* | 11/2020 | Siomina ............... H04W 24/08 |

FOREIGN PATENT DOCUMENTS

| | | |
|---|---|---|
| CN | 107787005 A | 3/2018 |
| EP | 2916581 A1 | 9/2015 |
| JP | 2014-093659 A | 5/2014 |
| WO | 2015/094084 A1 | 6/2015 |
| WO | 2016/069144 A1 | 5/2016 |
| WO | 2016/121608 A1 | 8/2016 |
| WO | 2017/144514 A1 | 8/2017 |
| WO | 2018/064483 A1 | 4/2018 |

OTHER PUBLICATIONS

Interdigital Inc., "RLM/RLF for NR-Unlicensed", 3GPP TSG-RAN WG2 NR AH1807 Meeting, R2-1809612, Jul. 2018, pp. 4.
Vivo, "Evaluation of the RLM for NR-U", 3GPP TSG RAN WG2, R2-1809882, Jul. 6, 2018, pp. 8.
Ericsson: "Handling DL LBT failures", 3GPP Draft; R2-1901751— Handling DL LBT Failures, 3rd Generation Partnership Project (3GPP), Mobile Competence Centre; 650, Route Des Lucioles; F-06921 Sophia-Antipolis Cedex; France vol. RAN WG2, No. Athens, Greece; Feb. 25, 2019-Mar. 1, 2019 Feb. 15, 2019 (Feb. 15, 2019), XP051603101, Retrieved from the Internet: URL:http://www.3gpp.org/ftp/tsg%5Fran/WG2%5FRL2/TSGR2%5F105/Docs/R2%2D1901751%2Ezip [retrieved on Feb. 19, 2019].
LG Electronics Inc: "RLM/RLF enhancements in NR-U", 3GPP Draft; R2-1908008 RLMRLF Enhancements in NR-U, 3rd Generation Partnership Project (3GPP), Mobile Competence Centre; 650, Route Des Lucioles; F-06921 Sophia-Antipolis Cedex; France, vol. RAN WG2, No. Reno, USA; May 13, 2019-May 17, 2019 (May 3, 2019), XP051712256, Retrieved from the Internet: URL:http://www.3gpp.org/ftp/tsg%5Fran/WG2%5FRL2/TSGR2%5F106/Docs/R2%2D1908008%2Ezip [retrieved on May 3, 2019].
Nokia et al., "RLM/RLF measurement on NR-U", 3GPP Draft; R2-1810214 RLM RLF Measurement on NR-U, 3rd Generation Partnership Project (3GPP), Mobile Competence Centre 650, Route Des Lucio Les . F-06921 Sophia-Antipolis Cedex; France, vol. RAN WG2, No. Montreal, Canada; Jul. 2, 2018-Jul. 6, 2018 (Jul. 1, 2018), XP051467407, Retrieved from the Internet: URL:http://www.3gpp.org/ftp/Meetings%5F3GP P%5FSYNC/RAN2/Docs [retrieved on Jul. 1, 2018].
Vivo: "Evaluation of the RLM for NR-U", 3GPP Draft; R2-1814267 Evaluation of the RLM for NR-U, 3rd Generation Partnership Project (3GPP), Mobile Competence Centre; 650, Route Des Lucioles; F-06921 Sophia-Antipolis Cedex; France vol. RAN WG2, No. Chengdu, China; Oct. 8, 2018-Oct. 12, 2018 (Sep. 28, 2018), XP051523719, Retrieved from the Internet: URL:http://www.3gpp.org/ftp/tsg%5Fran/WG2%5FRL2/TSGR2%5F103bis/Docs/R2%2D1814267%2Ezip [retrieved on Sep. 28, 2018].
Vivo: "Evaluation of the RLM in NR-U", 3GPP Draft; R2-1818270 Evaluation of the RLM in NR-U, 3rd Generation Partnership Project (3GPP), Mobile Competence Centre; 650, Route Des Lucioles; F-06921 Sophia-Antipolis Cedex; France vol. RAN WG2, No. Spokane, USA; Nov. 12, 2018-Nov. 16, 2018 Nov. 12, 2018 (Nov. 12, 2018), XP051557771, Retrieved from the Internet: URL:http://www.3gpp.org/ftp/Meetings%5F3GPP%5FSYNC/RAN2/Docs/R2%2DI818270%2Ezip [retrieved on Nov. 12, 2018].
Third Generation Partnership Project (3GPP), "Overall Description", Technical Specification Group Radio Access Network; Evolved Universal Terrestrial Radio Access (E-UTRA) and Evolved Universal Terrestrial Radio Access Network (E-UTRAN); Stage 2, Release 15, 3GPP TS 36.300 V15.0.0, Dec. 2017, 338 pages.
Third Generation Partnership Project (3GPP), "Requirements for Support of Radio Resource Management", Technical Specification Group Radio Access Network; NR; Release 15, 3GPP TS 38.133 V15.2.0, Jun. 2018, 79 pages.
Third Generation Partnership Project (3GPP), "Physical Layer Procedures for Control", Technical Specification Group Radio Access Network; NR, Release 15, 3GPP TS 38.213 V15.2.0, Jun. 2018, 99 pages.
Third Generation Partnership Project (3GPP), "Physical Layer Measurements", Technical Specification Group Radio Access Network; NR, Release 15, 3GPP TS 38.215 V15.2.0, Jun. 2018, 15 pages.
Third Generation Partnership Project (3GPP), "NR and NG-RAN Overall Description", Technical Specification Group Radio Access Network; NR, Stage 2, Release 15, 3GPP TS 38.300 V15.2.0, Jun. 2018, 87 pages.
Third Generation Partnership Project (3GPP), "Medium Access Control (MAC) Protocol Specification", Technical Specification Group Radio Access Network; NR, Release 15, 3GPP TS 38.321 V15.2.0, Jun. 2018, 73 pages.
Third Generation Partnership Project (3GPP), "Radio Resource Control (RRC) Protocol Specification", Technical Specification Group Radio Access Network; NR, Release 15, 3GPP TS 38.331 V15.2.1, Jun. 2018, 303 pages.
Third Generation Partnership Project (3GPP), "Physical Channels and Modulation" Technical Specification Group Radio Access Network; Evolved Universal Terrestrial Radio Access (E-UTRA), Release 15, 3GPP TS 36.211 V15.2.0, Jun. 2018, 236 pages.

* cited by examiner

RADIO LINK MONITORING AND RADIO RESOURCE MANAGEMENT MEASUREMENT PROCEDURES FOR NR-U

CROSS-REFERENCE TO RELATED APPLICATIONS

This application is the National Stage Application of International Patent Application No. PCT/US2019/045755 filed Aug. 8, 2019 which application claims the benefit of U.S. Provisional Patent Application No. 62/716,020, filed on Aug. 8, 2018, entitled "RLM And RRM Measurement Procedures For NR-U," the contents of which are hereby incorporated by reference herein.

BACKGROUND

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G."

SUMMARY

For New Radio Unlicensed (NR-U), a NR NodeB (e.g., gNB) may not be able to acquire a channel and transmit the Downlink Reference Signal (DL-RS) during a Transmission Opportunity (TXOP). If a user equipment (UE) attempts to measure the DL-RS during a blocked TXOP, the UE measurement may be calculated in error since the DL-RSs are not transmitted by the gNB. This may cause Radio Link Monitoring (RLM) measurement quantities to be erroneous which may cause the UE to declare out-of-sync even though the link quality may be good if the gNB were able to acquire the channel to send the reference signal for measurements. This may also cause the calculated Radio Resource Management (RRM) measurement quantities to be erroneous and may cause false or missed detection of measurement events. Therefore, for NR-U there is a need to enhance the RLM and RRM measurement procedures to handle blocked DL-RS TXOPs or the like.

In one aspect, disclosed herein are methods for performing RRM Measurements for NR-U that are based on a measurement model where a missed RS TXOP indicator may be provided to higher layers to adapt the measurement functions performed by the radio resource control (RRC) when a missed RS TXOP is detected.

In another aspect, disclosed herein are methods for performing RLM for NR-U based on in-sync or out-of-sync indications that are based on the estimated radio link quality in combination with missed RLM-RS TXOPs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION

With respect to LTE Licensed Assisted Access, carrier aggregation with at least one SCell operating in the unlicensed spectrum is referred to as Licensed-Assisted Access (LAA). In LAA, the configured set of serving cells for a UE therefore always includes at least one SCell operating in the unlicensed spectrum according to frame structure Type 3, also called LAA SCell. Unless otherwise specified, LAA SCells act as regular SCells.

LAA eNB and UE apply Listen-Before-Talk (LBT) before performing a transmission on LAA SCell. When LBT is applied, the transmitter listens to/senses the channel to determine whether the channel is free or busy. If the channel is determined to be free, the transmitter may perform the transmission; otherwise, it does not perform the transmission. If an LAA eNB uses channel access signals of other technologies for the purpose of LAA channel access, it shall continue to meet the LAA maximum energy detection threshold requirement. See also [1]—3GPP TS 36.300, (E-UTRAN); Overall description; Stage 2 (Release 15), V15.0.0.

Frame structure type 3 is applicable to LAA secondary cell operation with normal cyclic prefix only. Each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots where subframe i consists of slots i and 2i+1. See also [2]—3GPP TS 36.211, Physical channels and modulation (Release 15).

The 10 subframes within a radio frame are available for downlink or uplink transmissions. Downlink transmissions occupy one or more consecutive subframes, starting anywhere within a subframe and ending with the last subframe either fully occupied or following one of the DwPTS durations in as specified in Table 10.2-1 of 3GPP TS 36.211, Physical channels and modulation (Release 15). Uplink transmissions occupy one or more consecutive subframes.

Figure 1:
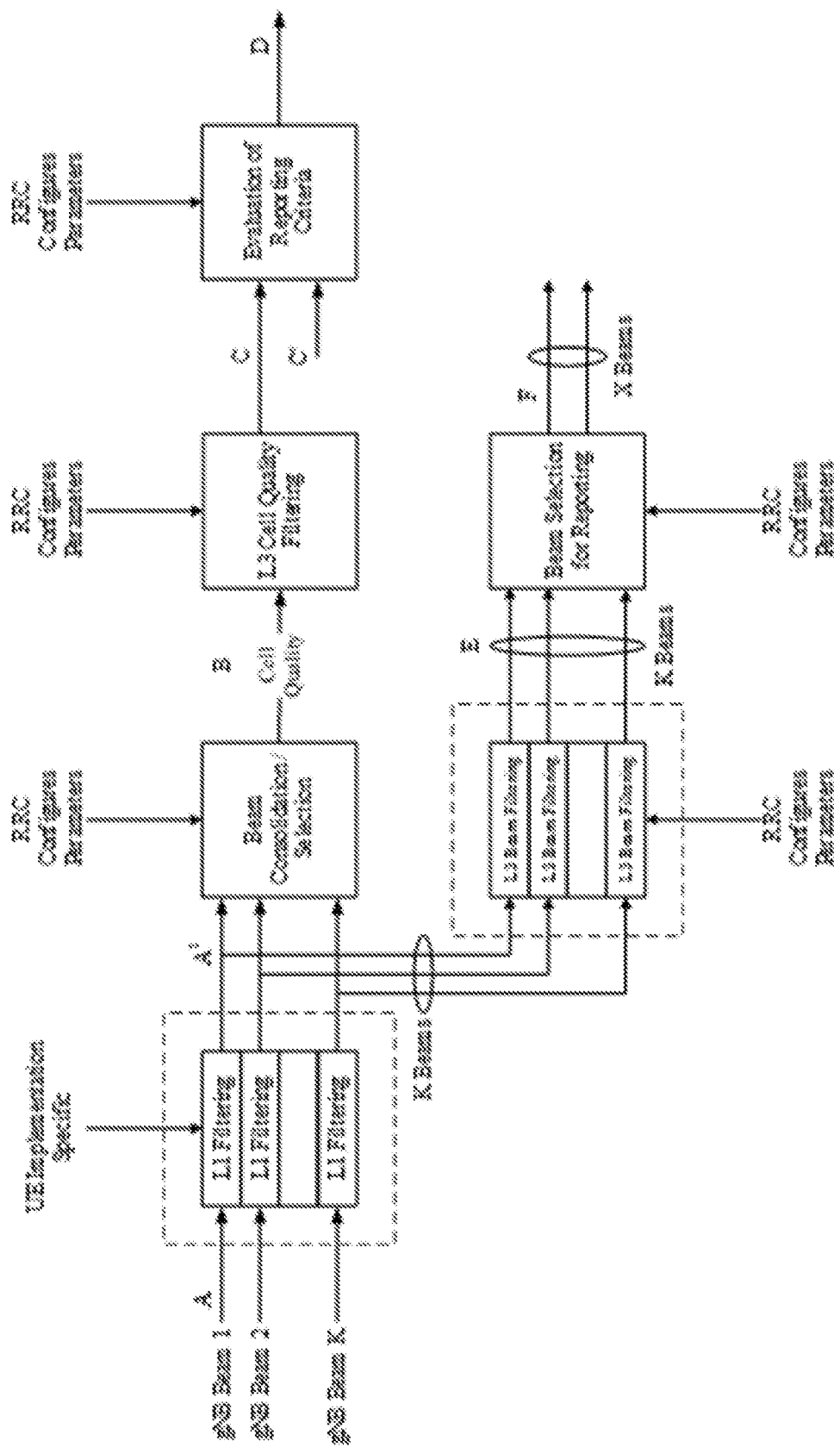
FIG. 1 illustrates an NR measurement model.

With respect to NR measurements, in RRC_CONNECTED, the UE measures multiple beams (at least one) of a cell and the measurements results (power values) are averaged to derive the cell quality. In doing so, the UE is configured to consider a subset of the detected beams. Filtering takes place at two different levels: at the physical layer to derive beam quality and then at RRC level to derive cell quality from multiple beams. Cell quality from beam measurements is derived in the same way for the serving cell(s) and for the non-serving cell(s). Measurement reports may contain the measurement results of the X best beams if the UE is configured to do so by the gNB. The NR measurement model is shown in FIG. 1—excerpted from 3GPP TS 38.300, NR; NR and NG-RAN Overall Description; Stage 2 (Release 15), V15.2.0. [3]—3GPP TS 38.300, NR; NR and NG-RAN Overall Description; Stage 2 (Release 15), V15.2.0.

For NR, the network may configure the UE to perform measurements based on SS/PBCH blocks (SSBs) or CSI-RS (Channel State Information Reference Signals) resources, where the measurement quantity may be Reference Signal Received Power (RSRP), Reference Signal Received Quality (RSRQ) or Signal-to-Noise and Interference Ratio (SINR). The physical layer measurements for NR are defined in [5]—3GPP TS 38.215, NR; Physical layer measurements (Release 15), V15.2.0.

With respect to NR radio link failure, in RRC_CONNECTED, the UE declares Radio Link Failure (RLF) when one of the following criteria are met: (1) expiry of a timer started after indication of radio problems from the physical layer (if radio problems are recovered before the timer is expired, the UE stops the timer); (2) random access procedure failure; or (3) RLC failure.

After RLF is declared, the UE: 1) stays in RRC_CONNECTED; 2) selects a suitable cell and then initiates RRC re-establishment; and 3) enters RRC_IDLE if a suitable cell wasn't found within a certain time after RLF was declared.

Figure 2:
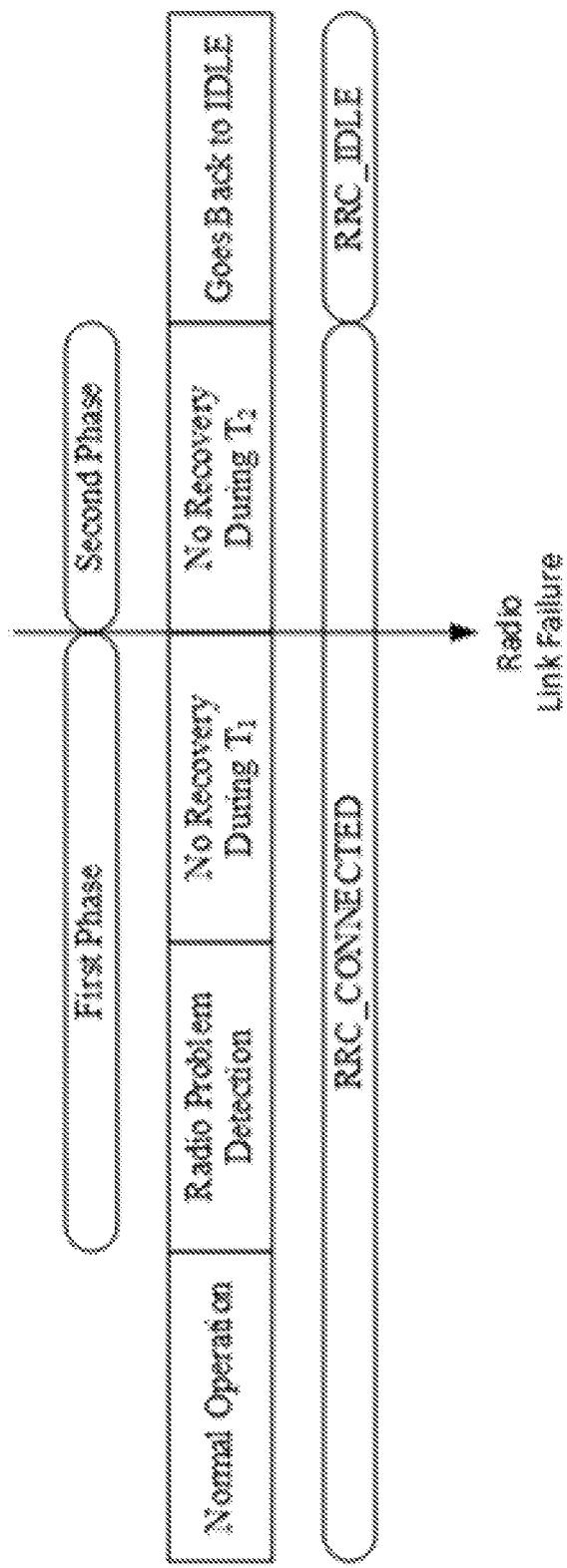
FIG. 2 illustrates radio link failure (RLF)

Two phases govern the behavior associated to radio link failure as shown in FIG. 2.

The First Phase: 1) started upon radio problem detection; 2) leads to radio link failure detection; 3) no UE-based mobility; and 4) based on timer or other (e.g. counting) criteria ($T_1$).

The Second Phase: 1) started upon radio link failure detection or handover failure; 2) leads to RRC_IDLE; 3) UE-based mobility; and 4) Timer based ($T_2$).

With Bandwidth Adaptation (BA) in NR, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

Figure 3:
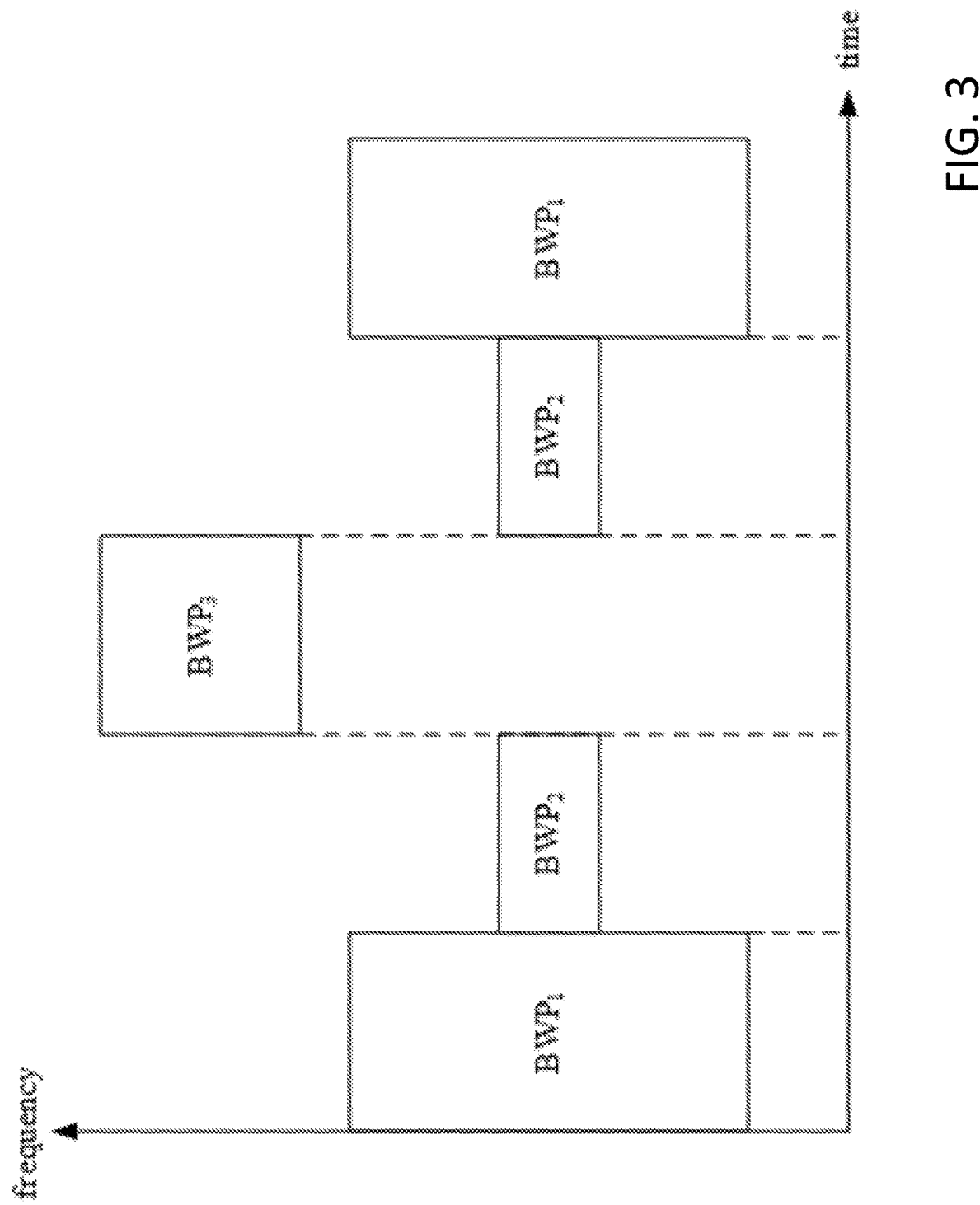
FIG. 3 is an example of Bandwidth Adaption (BA)

FIG. 3 illustrates a scenario where 3 different BWPs are configured: 1) BWP1 with a width of 40 MHz and subcarrier spacing of 15 kHz; 2) BWP2 with a width of 10 MHz and subcarrier spacing of 15 kHz; and 3) BWP3 with a width of 20 MHz and subcarrier spacing of 60 kHz.

A Serving Cell may be configured with at most four BWPs, and for an activated Serving Cell, there is always one active BWP at any point in time. The BWP switching for a Serving Cell is used to activate an inactive BWP and deactivate an active BWP at a time, and is controlled by the PDCCH indicating a downlink assignment or an uplink grant. Upon addition of SpCell (Special Cell) or activation of an SCell, one BWP is initially active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. See also [5] and [7]—3GPP TS 38.321, NR; Medium Access Control (MAC) Protocol Specification (Release 15), V15.2.0.

Turning now to Radio Link Monitoring (RLM) and Radio Resource Management (RRM), for New Radio Unlicensed (NR-U), a NR NodeB (e.g., gNB) may not be able to acquire a channel and transmit the Downlink Reference Signal (DL-RS) during a Transmission Opportunity (TXOP). If a user equipment (UE) attempts to measure the DL-RS during a blocked TXOP, the UE measurement may be calculated in error since the DL-RSs are not transmitted by the gNB. This may cause Radio Link Monitoring (RLM) measurement quantities to be erroneous which may cause the UE to declare out-of-sync even though the link quality may be good if the gNB were able to acquire the channel to send the reference signal for measurements. This may also cause the calculated RRM measurement quantities to be erroneous and may cause false or missed detection of measurement events. Therefore, for NR-U there is a need to enhance the RLM and RRM measurement procedures to handle blocked DL-RS TXOPs. In an example, blocked may be considered a situation in which a gNB is not able to acquire the channel and is therefore "blocked" from performing the transmission of the DL-RS during the TXOP.

In one aspect, disclosed herein are methods for performing RRM Measurements for NR-U that are based on a measurement model where a Missed RS TXOP Indicator is provided to higher layers to adapt the measurement functions performed by the RRC when a missed RS TXOP is detected.

In another aspect, disclosed herein are methods for performing RLM for NR-U based on in-sync/out-of-sync indications that are based on the estimated radio link quality in combination with missed RLM-RS TXOPs.

Methods to Perform RLM for NR-U

Figure 4:
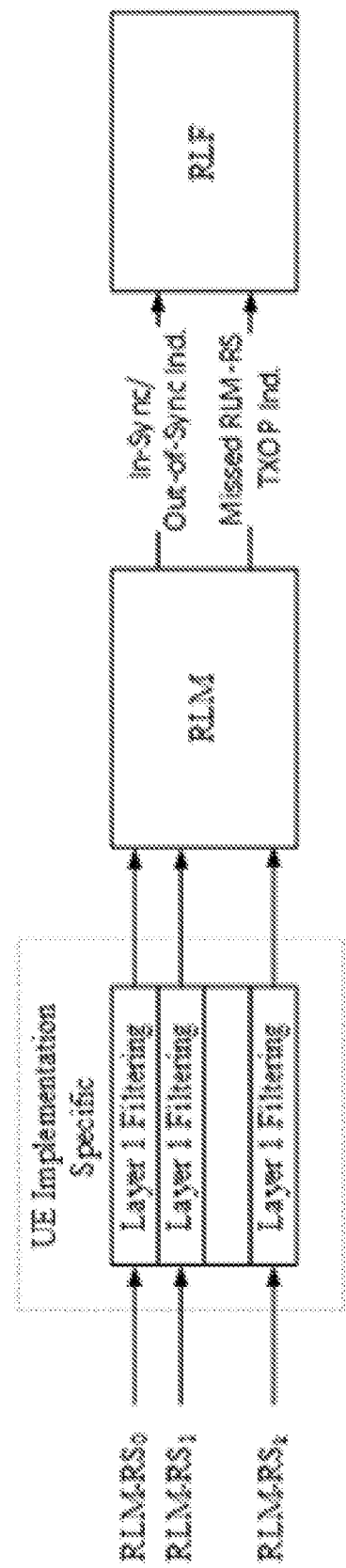
FIG. 4 illustrates an NR-U RLM/RLF model.

Disclosed below are methods for performing RLM for NR-U. The UE may monitor the downlink link quality based on the reference signal in the configured RLM-RS resource(s) in order to detect the downlink radio link quality of the PCell and PSCell. In addition to monitoring the downlink link quality, the UE may monitor the number of missed RLM-RS TXOPs. With regard to the monitoring the downlink quality, a UE may perform measurements of reference signals configured for the purpose of determining the DL link quality; when the measurement is above or below a configured threshold, the radio link may be determined to be in-sync or out-of-sync. The count of the number of missed RLM-RS TXOPs may then be used in combination with the downlink link quality estimates to detect RLF. The configured RLM-RS resources can be all SSBs, or all CSI-RSs, or a mix of SSBs and CSI-RSs. FIG. 4 is an illustration of an exemplary NR-U RLM/RLF model.

Detection of Missed RLM-RS TXOPs

The monitoring of the missed RLM-RS TXOPs may be based on the detection of a Discovery Reference Signal (DRS), Channel Access Indication (CAI) signal or any other signal transmitted by the gNB that can be used by the UE to confirm the gNB has acquired the channel. The properties of the channel usage signal may be such that it can be detected reliably within a single TXOP, e.g., does not require combining across multiple TXOPs. The "channel usage" signal may be multiplexed with the RLM-RSs using Frequency Division Multiplexing (FDM) or Time Division Multiplexing (TDM) techniques.

Detection of the CAI may be explicit or implicit. If the UE receives PDSCH in a slot/channel occupancy time (COT) configured for SSB/CSIRS, the UE may implicitly know that the RS is available.

For explicit signaling, a PSS/SSS like signal may be transmitted by the gNB when it acquires the channel for the COT. The UE monitors for this signal and identifies that the transmission is that of gNB. So it recognizes that RS will be available within the duration of the COT.

Alternatively, for configurations where a licensed band downlink is also available, the gNB may transmit downlink control information (DCI) on the licensed band downlink to indicate whether or not the unlicensed channel was acquired during the RLM-RS TXOP. For example, DCI Format_2_X comprised of the information shown in Table 1 and scrambled by C-RNTI, a common RNTI or a group RNTI may be used to indicate a missed TXOP for a specific RLM-RS on a specific carrier.

TABLE 1

Exemplary DCI Format_2_X

| Name | Description |
| --- | --- |
| Identifier for DCI formats (1 bit) | The value of this bit field set to 1, indicating a DL DCI format |
| Carrier indicator (3 bits) | |
| RLM-RS ID (3 bits) | Index in list of configured RLM-RSs |

And in yet another alternative, the detection of missed RLM-RS TXOPs may be threshold based. For example, if the value of the RLM-RS RSRP measurement is below a threshold, the UE assumes that the RLM-RS TXOP has been missed. The value of the threshold may be signaled to the UE by higher layers (e.g. RRC signaling). For example, the threshold may be signaled as the parameter rlmDetectionThreshold that is included in the SpCellConfig Information Element (IE) as shown in Table 2.

TABLE 2

Exemplary NR-U SpCellConfig IE;

| SpCellConfig ::= | SEQUENCE { | |
| --- | --- | --- |
| servCellIndex | ServCellIndex | OPTIONAL,-- Cond SCG |
| reconfigurationWithSync | ReconfigurationWithSync | OPTIONAL,-- Cond ReconfWithSync |
| rlf-TimersAndConstants | SetupRelease {RLF-TimersAndConstants} | OPTIONAL, -- Need M |
| rlmInSyncOutOfSyncThreshold | ENUMERATED {n1} | OPTIONAL,-- Need S |
| rlmDetectionThreshold | RSRP-Range, | OPTIONAL, |
| spCellConfigDedicated | ServingCellConfig | OPTIONAL,-- Need M |
| } | | |

As another alternative, to detect the absence of RLM-RS(s), it may only be transmitted when it is associated (e.g., overlap) with other configured or scheduled downlink transmissions burst that are transmitted successfully. In other words, the RLM-RS and the associated DL transmission burst are always within the same COT. For example, if the RLM-RS(s) is associated with particular SSB and UE fails to detect this SSB, then UE may infer that gNB does not acquire channel successfully and consider this as missed RLM-RS TXOP. As another example, if RLM-RS is associated with particular Control Resource Set (CORESET) and UE fails to decode the PDCCH within this CORESET, then UE can infer that gNB does not acquire channel successfully and consider this as missed RLM-RS TXOP.

Transmission burst associated RLM-RS may be signaled to the UE by higher layers (e.g. RRC signaling). For example, an RLM-AssociatedBurst IE that may take values such as SSBID, CORESETID, etc., may be signaled to the UE.

Detection of RLF (Alternative 1)

As discussed herein, detection of RLF for NR-U may be based on in-sync or out-of-sync indications that are based on the estimated radio link quality in combination with missed RLM-RS TXOPs. On each RLM-RS resource, the UE estimates the downlink radio link quality and compares it to the thresholds $Q_{out}$ and $Q_{in}$ for the purpose of monitoring downlink radio link quality of the cell. The threshold $Q_{out}$ may be defined as the level at which the downlink radio link cannot be reliably received, e.g. an out-of-sync Block Error Rate ($BLER_{out}$) of 10%. The threshold $Q_{in}$ may be defined as the level at which the downlink radio link quality can be significantly more reliably received than at $Q_{out}$, e.g. an in-sync Block Error Rate ($BLER_{in}$) of 2%. The use of other values for $BLER_{out}$ and $BLER_{in}$ are not precluded, wherein the values may be determined by the gNB, based on measurements performed by or reported to the gNB (e.g., channel occupancy), and signaled to the UE via higher layers, e.g. SI broadcast or dedicated signaling.

The physical layer in the UE indicates, in frames where the link quality is assessed, a missed RLM-RS TXOP when the UE detects that the RLM-RS TXOP was missed for all the resources in the set of resources configured for radio link monitoring. The UE evaluates whether the number of RLM-RS TXOPs that were missed over the last $T_{Evaluate\_missed\_TXOP}$ period becomes greater than the threshold $N_{Missed\_TXOP}$. The monitoring the number of missed RLM-RS TXOPs may be based on when $N_{Missed\_TXOP}$ are received within $T_{Evaluate\_missed\_TXOP}$ period. The values of the parameters $T_{Evaluate\_missed\_TXOP}$ and $N_{Missed\_TXOP}$ may be signaled to the UE by higher layers (e.g. RRC signaling). For example, $T_{Evaluate\_missed\_TXOP}$ and $N_{Missed\_TXOP}$ may be signaled as T312 and N312 respectively via the RLF-TimersAndConstants IE as shown in Table 3. The NR-U RLF timers and constants may be defined as provided in Table 4 and Table 5 respectively. The timer may be started upon detection of a missed RLM-RS TXOP. See Table 4 and Table 6.

TABLE 3

Exemplary NR-U RLF-TimersAndConstants IE

| RLF-TimersAnd Constants ::= | SEQUENCE { | |
|---|---|---|
| t310 | ENUMERATED {ms0, ms50, ms100, ms200, ms500, ms1000, ms2000, ms4000, ms6000}, | |
| t312 | ENUMERATED {ms0, ms50, ms100, ms200, ms500, ms1000, ms2000, ms4000, ms6000}, | |
| n310 | ENUMERATED {n1, n2, n3, n4, n6, n8, n10, n20}, | |
| n311 | ENUMERATED {n1, n2, n3, n4, n5, n6, n8, n10}, | |
| n312 | ENUMERATED {n1, n2, n3, n4, n6, n8, n10, n20}, | |
| ... | | |
| } | | |

TABLE 4

NR-U RLF Timers

| Timer | Start | Stop | At Expiry |
|---|---|---|---|
| T310 | Upon detecting physical layer problems for the SpCell, e.g., upon receiving N310 consecutive out-of-sync indications from lower layers. | Upon receiving N311 consecutive in-sync indications from lower layers for the SpCell, upon receiving RRCReconfiguration with reconfigurationWithSync for that cell group, and upon initiating the connection re-establishment procedure. Upon SCG release, if the T310 is kept in SCG. | If the T310 is kept in MCG: If security is not activated: go to RRC_IDLE else: initiate the connection re-establishment procedure. If the T310 is kept in SCG, Inform E-UTRAN or NR about the SCG radio link failure by initiating the SCG failure information procedure as specified in section 5.7.3 of 3GPP TS 38.331, Radio Resource Control (RRC) protocol specification (Release 15), V15.2.1. |
| T312 | Upon detecting a missed RLM-RS TXOP, provided T312 is not already running. | Not applicable (NA) | NA |

TABLE 5

NR-U RLF Constants

| Constant | Usage |
|---|---|
| N310 | Maximum number of consecutive "out-of-sync" indications for the PCell received from lower layers |
| N311 | Maximum number of consecutive "in-sync" indications for the PCell received from lower layers |
| N312 | Maximum number of "missed" RLM-RS TXOPs received from lower layers |

RLF Related Actions for RRC (Alternative 1)

For NR-U, the RLF detection may be performed by the RRC. Exemplary descriptions of the RLF related actions performed by the RRC for Alternative 1 are shown in Table 6, Table 7, or Table 8.

TABLE 6

Exemplary RRC Actions For Detection Of Physical Layer Problems

The UE shall:
1> upon receiving N310 consecutive "out-of-sync" indications for the SpCell from lower layers while T311 is not running:
2> start timer T310 for the corresponding SpCell.

TABLE 6-continued

Exemplary RRC Actions For Detection Of Physical Layer Problems

1> upon receiving a "missed" RLM-RS TXOP indication for the SpCell from lower layers while T312 is not running:
2> start timer T312 for the corresponding SpCell.

TABLE 7

Exemplary RRC Actions For Recovery Of Physical Layer Problems

Upon receiving N311 consecutive "in-sync" indications for the SpCell from lower layers while T310 is running, the UE shall:
    1> stop timer T310 for the corresponding SpCell.
NOTE 1: In this case, the UE maintains the RRC connection without explicit signaling, e.g. the UE maintains the entire radio resource configuration.
NOTE 2: Periods in time where neither "in-sync" nor "out-of-sync" is reported by layer 1 do not affect the evaluation of the number of consecutive "in-sync" or "out-of-sync" indications.

TABLE 8

Exemplary RRC Actions For Detection Of RLF

The UE shall:
   1>     upon T310 expiry in PCell; or
   1>     upon receiving N312 "missed" RLM-RS TXOPs while timer T312 is running; Or
   1>     upon random access problem indication from MCG MAC while T311 is not
        running; or
   1>     upon indication from MCG RLC that the maximum number of
retransmissions has been reached:
        2>     consider radio link failure to be detected for the MCG i.e. RLF;
        2>     if AS security has not been activated:
            3>     perform the actions upon leaving RRC_CONNECTED as
specified in 5.3.11 of [4], with release cause 'other'; ([4] – 3GPP TS 38.331, Radio
Resource Control (RRC) protocol specification (Release 15), V15.2.1)
        2>     else:
            3>     initiate the connection re-establishment procedure as
specified in 5.3.7 of [4].
Note: When performing a connection re-establishment procedure that was triggered upon
receiving N312 "missed" RLM-RS TXOPs while timer T312 is running, we propose that
the UE considers the SpCell on which the RLF was detected as barred.
The UE shall:
   1>     upon T310 expiry in PSCell; or
   1>     upon receiving N312 "missed" RLM-RS TXOPs while timer T312 is running;
      or
1>     upon random access problem indication from SCG MAC; or
1>     upon indication from SCG RLC that the maximum number of retransmissions
        has been reached:
        2>     consider radio link failure to be detected for the SCG i.e. SCG-RLF;
        2>     initiate the SCG failure information procedure as specified in 5.7.3
            of [4] to report SCG radio link failure..

Detection of RLF (Alternative 2)

Figure 5:
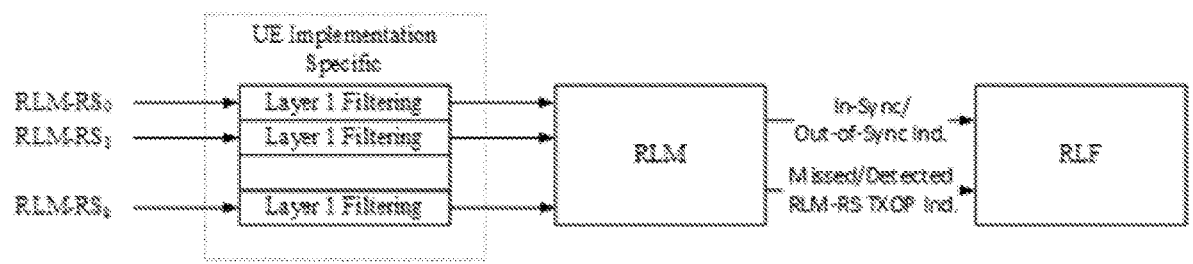
FIG. 5 illustrates an NR-U RLM/RLF model.

For Alternative 2, detection of RLF for NR-U is also based on missed RLM-RS TXOPs in combination with in-sync or out-of-sync indications that are based on the estimated radio link quality. Monitoring and detection of RLF based on the downlink link quality is as described in Alternative 1. The method to detect RLF based on missed RLM-RS TXOPs is different as compared to Alternative 1. In Alternative 2, monitoring and detection of RLF based on "missed" RLM-RS TXOPs uses an alternative method, where an indication is provided to higher layers when the UE detects a "missed" RLM-RS TXOP and when the UE detects that the RLM-RS was transmitted during the RLM-RS TXOP, as shown in FIG. 5. In FIG. 4, an indication of missed RLM-RS-TXOPs is provided to higher layers. In FIG. 5, an indication of missed and detected RLM-RS-TXOPs is provided to higher layers. The detected RLM-RS-TXOPs may be used to stop timer T312.

Upon detection of N312 consecutive missed RLM-RS TXOPs, the UE starts timer T312. The timer is stopped upon detection of RLM-RSs during N313 consecutive RLM-RS TXOPs. More generally, the timer may be stopped when reference signals are detected during a threshold number (e.g., $N_{detected\_TXOP}$) of consecutive reference signal TXOPs. The threshold number may be preconfigured by the RRC. RLF is declared upon expiration of timer T312. The values of timer T312 and constants N312 and N313 may be signaled to the UE by higher layers (e.g. RRC signaling) via the RLF-TimersAndConstants IE as shown in Table 9. The NR-U RLF timers and constants used for Alternative 2 may be defined as provided in Table 10 and Table 11 respectively.

TABLE 9

Exemplary NR-U RLF-TimersAndConstants IE

| | |
|---|---|
| RLF-TimersAndConstants ::= | SEQUENCE { |
| t310 | ENUMERATED {ms0, ms50, ms100, ms200, ms500, ms1000, ms2000, ms4000, ms6000}, |
| t312 | ENUMERATED {ms0, ms50, ms100, ms200, ms500, ms1000, ms2000, ms4000, ms6000}, |
| n310 | ENUMERATED {n1, n2, n3, n4, n6, n8, n10, n20}, |
| n311 | ENUMERATED {n1, n2, n3, n4, n5, n6, n8, n10}, |
| n312 | ENUMERATED {n1, n2, n3, n4, n6, n8, n10, n20}, |
| n313 | ENUMERATED {n1, n2, n3, n4, n5, n6, n8, n10}, |
| . . . | |
| } | |

TABLE 10

NR-U RLF Timers (Alternative 2)

| Timer | Start | Stop | At Expiry |
|---|---|---|---|
| T310 | Upon detecting physical layer problems for the SpCel, e.g., upon receiving N310 consecutive out-of-sync indications from lower layers. | Upon receiving N311 consecutive in-sync indications from lower layers for the SpCell, upon receiving RRCReconfiguration with | If the T310 is kept in MCG: If security is not activated: go to RRC_IDLE else: initiate the connection re-establishment procedure. If the T310 is kept in |

TABLE 10-continued

NR-U RLF Timers (Alternative 2)

| Timer | Start | Stop | At Expiry |
|---|---|---|---|
| | | reconfigurationWithSync for that cell group, and upon initiating the connection re-establishment procedure. Upon SCG release, if the T310 is kept in SCG. | SCG, Inform E-UTRAN or NR about the SCG radio link failure by initiating the SCG failure information procedure as specified in section 5.7.3 of 3GPP TS 38.331, Radio Resource Control (RRC) protocol specification (Release 15), V15.2.1. |
| T312 | Upon receiving N312 consecutive missed RLM-RS TXOPs indications from lower layers. | Upon receiving indications of detection of RLM-RSs during N313 consecutive RLM-RS TXOPs from lower layers for SpCell, upon receiving RRCReconfiguration with reconfigurationWithSync for that cell group, and upon initiating the connection re-establishment procedure. Upon SCG release, if the T310 is kept in SCG. | If the T310 is kept in MCG: If security is not activated: go to RRC_IDLE else: initiate the connection re-establishment procedure. If the T310 is kept in SCG, Inform E-UTRAN or NR about the SCG radio link failure by initiating the SCG failure information procedure as specified in section 5.7.3 of 3GPP TS 38.331, Radio Resource Control (RRC) protocol specification (Release 15), V15.2.1. |

TABLE 11

NR-U RLF Constants (Alternative 2)

| Constant | Usage |
|---|---|
| N310 | Maximum number of consecutive "out-of-sync" indications for the PCell received from lower layers |
| N311 | Maximum number of consecutive "in-sync" indications for the PCell received from lower layers |
| N312 | Maximum number of consecutive "missed" RLM-RS TXOPs received from lower layers |
| N313 | Maximum number of consecutive "detected" RLM-RS TXOPs received from lower layers |

RLF Related Actions for RRC (Alternative 2)

For NR-U, the RLF detection may be performed by the RRC. Exemplary descriptions of the RLF related actions performed by the RRC for Alternative 2 are shown in Table 12, Table 13, and Table 14.

TABLE 12

Exemplary RRC Actions For Detection Of Physical Layer Problems

The UE shall:
   1> upon receiving N310 consecutive "out-of-sync" indications for the SpCell from lower layers while T311 is not running:
      2> start timer T310 for the corresponding SpCell.
   1> upon receiving N312 consecutive "missed" RLM-RS TXOP indications for the SpCell from lower layers while T312 is not running:
      2> start timer T312 for the corresponding SpCell.

TABLE 13

Exemplary RRC Actions For Recovery Of Physical Layer Problems

Upon receiving N311 consecutive "in-sync" indications for the SpCell from lower layers while T310 is running, the UE shall:
   1> stop timer T310 for the corresponding SpCell.
Upon detection of RLM-RSs during N313 consecutive RLM-RS TXOPs while T312 is running, the UE shall:
   1> stop timer T312 for the corresponding SpCell.
NOTE 1: In this case, the UE maintains the RRC connection without explicit signalling, e.g. the UE maintains the entire radio resource configuration.
NOTE 2: Periods in time where neither "in-sync" nor "out-of-sync" is reported by layer 1 do not affect the evaluation of the number of consecutive "in-sync" or "out-of-sync" indications.

TABLE 14

Exemplary RRC Actions For Detection Of RLF

The UE shall:
1> upon T310 expiry in PCell; or
1> upon T312 expiry in PCell; or
1> upon random access problem indication from MCG MAC while T311 is not running; or
1> upon indication from MCG RLC that the maximum number of retransmissions has been reached:
    2> consider radio link failure to be detected for the MCG i.e. RLF;
    2> if AS security has not been activated:
        3> perform the actions upon leaving RRC_CONNECTED as specified in 5.3.11 of [4], with release cause 'other';
    2> else:
        3> initiate the connection re-establishment procedure as specified in 5.3.7 of [4]
Note: When performing a connection re-establishment procedure that was triggered by timer T312 expiry, we propose that the UE considers the SpCell on which the RLF was detected as barred.
The UE shall:
1> upon T310 expiry in PSCell; or
1> upon T312 expiry in PSCell; or
1> upon random access problem indication from SCG MAC; or
1> upon indication from SCG RLC that the maximum number of retransmissions has been reached:
    2> consider radio link failure to be detected for the SCG e.g. SCG-RLF;
    2> initiate the SCG failure information procedure as specified in 5.7.3 of [4] to report SCG radio link failure.

Detection of RLF (Alternative 3)

For configurations where wideband carriers are used, there may be scenarios where part of the channel may be occupied by other users', e.g., Wi-Fi users, while the remaining part is unoccupied. To optimize utilization of the channel, it is proposed the gNB performs sub-band LBT when accessing the channel for some downlink transmissions, e.g. transmission of RLM-RSs. Disclosed herein is a model of the multiple sub-bands as different BWP configurations, each with its own set of RLM resources.

In one example the gNB transmits the RLM-RSs on all the configured DL-BWPs for a given UE, in accordance with the result of the sub-band LBT performed on each corresponding DL-BWP. When the UE detects physical layer problems on the active DL-BWP, it may perform a BWP switch. If the UE does not recover from the physical layer problems after performing the BWP switch, additional BWP switches may be performed prior do declaring RLF. The value of timer T310 and constants N312 and N313 may be signaled to the UE by higher layers (e.g., RRC signaling) via the RLF-TimersAndConstants IE as shown in Table 15. The NR-U RLF timers and constants used for Alternative 3 are defined in Table 16 and Table 17 respectively.

TABLE 15

Exemplary NR-U RLF-Timersandconstants IE

RLF-TimersAndConstants ::=   SEQUENCE {
  t310    ENUMERATED {ms0, ms50, ms100, ms200, ms500, ms1000, ms2000, ms4000, ms6000},
  n310    ENUMERATED {n1, n2, n3, n4, n6, n8, n10, n20},
  n311    ENUMERATED {n1, n2, n3, n4, n5, n6, n8, n10},
  . . .
}

TABLE 16

NR-U RLF Timers (Alternative 3)

| Timer | Start | Stop | At Expiry |
|---|---|---|---|
| T310 | Upon detecting physical layer problems for the SpCell, e.g., upon receiving N310 consecutive out-of-sync indications from lower layers. | Upon receiving N311 consecutive in-sync indications from lower layers for the SpCell, upon receiving RRCReconfiguration with reconfigurationWithSync for that cell group, and upon initiating the connection re-establishment procedure. Upon SCG release, if the T310 is kept in SCG. | If the T310 is kept in MCG: If security is not activated: go to RRC_IDLE else: initiate the connection re-establishment procedure. If the T310 is kept in SCG, Inform E-UTRAN or NR about the SCG radio link failure by initiating the SCG failure information procedure as specified in section 5.7.3 of 3GPP TS 38.331, Radio Resource Control (RRC) protocol specification (Release 15), V15.2.1. |

TABLE 17

NR-U RLF Constants (Alternative 3)

| Constant | Usage |
|---|---|
| N310 | Maximum number of consecutive "out-of-sync" indications for the PCell received from lower layers |
| N311 | Maximum number of consecutive "in-sync" indications for the PCell received from lower layers |

RLF Related Actions for RRC (Alternative 3)

For NR-U, the RLF detection may be performed by the RRC. Exemplary descriptions of the RLF related actions performed by the RRC for Alternative 3 are shown in Table 18, Table 19 and Table 20.

TABLE 18

Exemplary RRC Actions For Detection Of Physical Layer Problems

The UE shall:
    1>    upon receiving N310 consecutive "out-of-sync" indications for the SpCell from lower layers while T311 is not running:
        2>    if timer T310 is not running:
            3>    start timer T310 for the corresponding SpCell;
        2> else:
            3>    switch DL-BWPs.
Note: If the UE is capable of monitoring RLM-RS's from multiple BWPs simultaneously, the UE may switch to a DL-BWP for which RLM-RS's have been detected. Alternatively, the UE may switch to a BWP that is different than the active BWP. If more than 2 BWPs are configured, the UE may switch to a DL-BWP that has not yet been attempted since starting timer T310.

TABLE 19

Exemplary RRC Actions For Recovery Of Physical Layer Problems

Upon receiving N311 consecutive "in-sync" indications for the SpCell from lower layers while T310 is running, the UE shall:
    1>    stop timer T310 for the corresponding SpCell.
NOTE 1:    In this case, the UE maintains the RRC connection without explicit signaling, e.g., the UE maintains the entire radio resource configuration.
NOTE 2:    Periods in time where neither "in-sync" nor "out-of-sync" is reported by layer 1 do not affect the evaluation of the number of consecutive "in-sync" or "out-of-sync" indications.

TABLE 20

Exemplary RRC Actions For Detection Of RLF

The UE shall:
    1>    upon T310 expiry in PCell; or
    1>    upon random access problem indication from MCG MAC while T311 is not running; or
    1>    upon indication from MCG RLC that the maximum number of retransmissions has been reached:
        2>    consider radio link failure to be detected for the MCG e.g. RLF;
        2>    if AS security has not been activated:
            3>    perform the actions upon leaving RRC_CONNECTED as specified in 5.3.11 of [4], with release cause 'other';
        2>    else:
            3>    initiate the connection re-establishment procedure as specified in 5.3.7 of [4].
The UE shall:
    1>    upon T310 expiry in PSCell; or
    1>    upon random access problem indication from SCG MAC; or
    1>    upon indication from SCG RLC that the maximum number of retransmissions has been reached:
        2>    consider radio link failure to be detected for the SCG e.g. SCG-RLF;
        2>    initiate the SCG failure information procedure as specified in 5.7.3 of [4] to report SCG radio link failure.

An alternative to triggering the BWP switching at the RRC may be to also perform the detection of physical layer problems at the MAC layer and trigger BWP switch upon detection of a physical layer problem by the MAC. In this alternative, the actions performed by the RRC for detection of physical layer problems are shown in Table 21. The remaining RRC actions for recovery of physical layer problems and detection of RLF are shown in Table 19 and Table 20. The actions performed by the MAC for detection of physical layer problems are shown in Table 22.

TABLE 21

Exemplary RRC Actions For Detection Of Physical Layer Problems

The UE shall:
1> upon receiving N310 consecutive "out-of-sync" indications for the SpCell from lower layers while T311 is not running:
2> start timer T310 for the corresponding SpCell.

TABLE 22

Exemplary MAC Actions For Detection Of Physical Layer Problems

The MAC entity shall:
1> if an "out-of-sync" indication has been received from lower layers:
2> start or restart the oosDetectionTimer;
2> increment OOS_COUNTER by 1;
2> if OOS_COUNTER >= oosIndMaxCount:
3> if the defaultDownlinkBWP is configured and the active DL BWP is not the BWP indicated by the defaultDownlinkBWP:
4> perform BWP switching to a BWP indicated by the defaultDownlinkBWP.
3> else:
4> perform BWP switching to the initialDownlinkBWP.
1> if oosDetectionTimer expires:
2> set OOS_COUNTER to 0.

In this alternative, the out-of-sync indications received by the MAC layer may be based on the estimated radio link quality. Alternatively, the out-of-sync indications may be based on the estimated radio link quality in combination with missed RLM-RS TXOPs. And in yet another alternative, the detection of physical layer problems by the MAC layer may be based solely on missed, RLM-RS TXOPs; e.g., reception of Missed RLM-RS TXOP Indications.

As an alternative to switching to the defaultDownlinkBWP or the initialDownlinkBWP, the UE may autonomously switch to any other configured DL BWP. For example, the UE may increment the BWP-ID of the active BWP by 1 modulo the number of configured BWPs. If the UE has not recovered from the physical layer problems after cycling through all the configured BWPs, the UE may switch to the defaultDownlinkBWP or initialDownlinkBWP.

Detection of RLF (Alternative 4)

For Alternative 4, detection of RLF for NR-U may be based on receiving N310 consecutive out-of-sync indications. A timer-based recovery period may not be defined; e.g. RLF is declared upon detecting N310 consecutive out-of-sync indications. In one example, an out-of-sync indication may be generated when a missed RLM-RS TXOP is detected. Higher layers may increment counter N310 upon receiving an out-of-sync indication and declare RLF when the maximum value is reached. Counter N310 is reset upon receiving N311 consecutive "in-sync" indications.

In an alternate example, an in-sync or out-of-sync indication may not be generated in frames where the link quality is assessed and the UE detects that the RLM-RS TXOP was missed for all the resources in the set of resources configured for radio link monitoring. Higher layers may increment counter N310 upon receiving an out-of-sync indication and declare RLF when the maximum value is reached. Counter N310 may be reset upon receiving N311 consecutive "in-sync" indications. The counter values for N310 and N311 may not be updated during frames where a missed RLM-RS TXOP is detected.

In yet another example, the PHY layer provides to the upper layer, indication of instances where the UE failed to detect RLM reference signals as a result of failed LBT in the gNB. These instances may be called here missed RLM-RS TXOP. The UE upper layer may not reset the counters N310, N311 upon reception of missed RLM-RS TXOP. The reception of missed RLM-RS TXOP indication by upper layer may not impact the counting of received consecutives in-sync (IS) indications or received consecutive out-of-sync indication (OOS). The timer used to control the declaration of radio link failure once radio link problem is detected (e.g., timer T310) is adjusted to account for missed RLM-RS TXOP. For e.g., upon reception of missed RLM-RS-TXOP, the timer T310 may be stopped and resumed upon reception of IS indication or upon reception of OOS indication.

Methods to Perform RRM Measurements for NR-U

Figure 6:
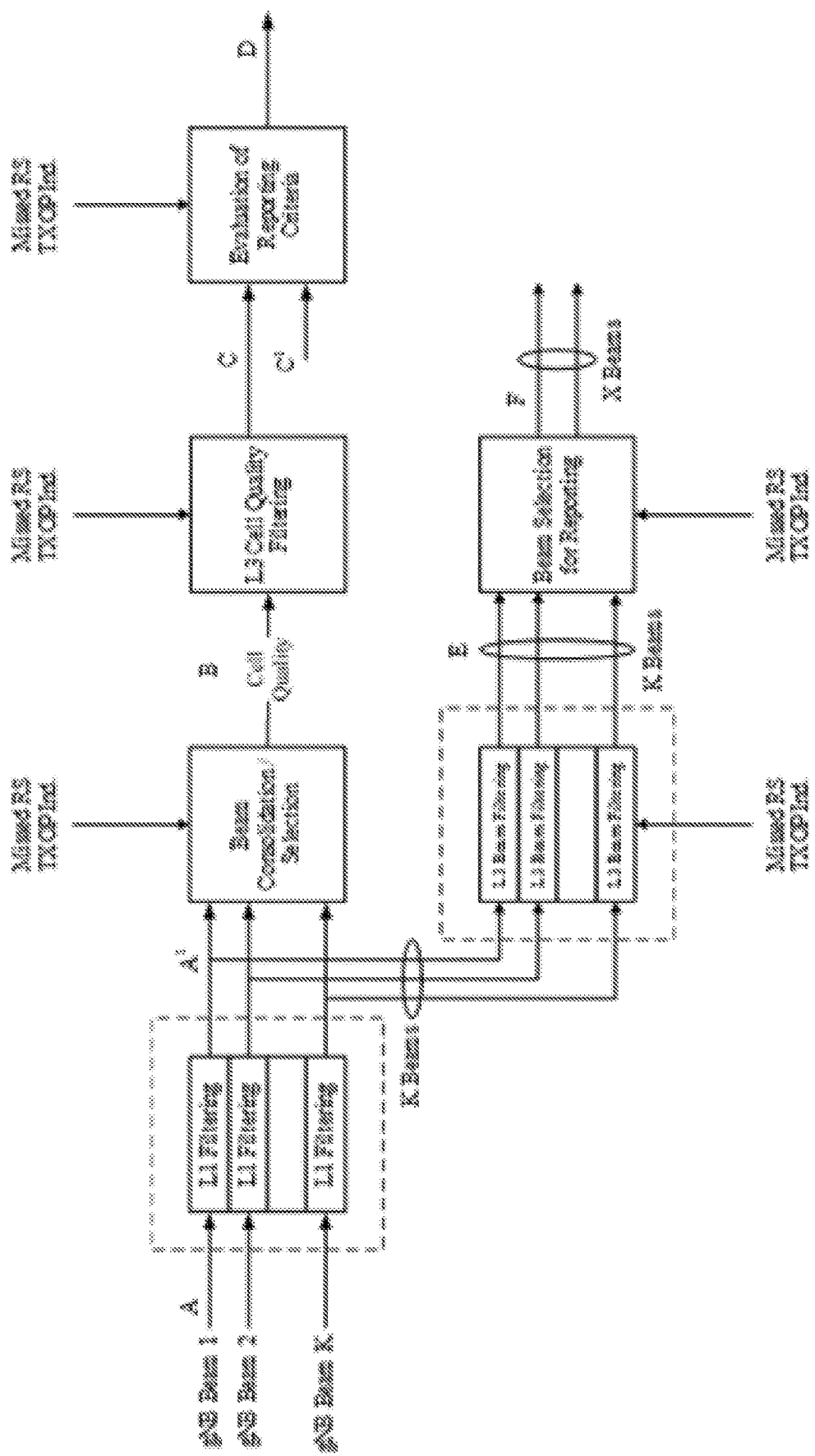
FIG. 6 illustrates a NR-U measurement model.

FIG. 6 is an exemplary NR-U measurement model where a Missed RS TXOP Indicator may be provided to higher layers to adapt the measurement functions performed by the RRC when a missed RS TXOP is detected. Disclosed below are further description with regard to measurements or filtering.

A: measurements (beam specific samples) internal to the physical layer.

Layer 1 filtering: internal layer 1 filtering of the inputs measured at point A. Exact filtering is implementation dependent. How the measurements are actually executed in the physical layer by an implementation (inputs A and Layer 1 filtering) is not constrained by the standard.

$A^1$: measurements (e.g. beam specific measurements) reported by layer 1 to layer 3 after layer 1 filtering. When a missed RS TXOP is detected, L1 may discard the measurement sample that would have been a function of the "missed" input; e.g. layer 1 does not report the measurement to layer 3. As a result, the rate of the measurement samples at $A^1$ may vary. Alternatively, layer 1 may report all measurements to layer 3 and layer 3 may discard the measurement sample associated with a missed RS TXOP. The discarding of a measurement sample by layer 3 may be based on an explicit indication received from layer 1 (e.g. a Missed RX TXOP Indicator, a measurement sample with a reserved value, etc.) or a layer 3 may apply threshold test to determine if the measurement sample should be discarded (e.g. measurements below a configured threshold are discarded).

Beam Consolidation or Selection: beam specific measurements may be consolidated to derive cell quality. The behavior of the Beam consolidation or selection is standardized and the configuration of this module is provided by RRC signaling. Reporting period at B equals one measurement period at $A^1$.

B: a measurement (e.g. cell quality) derived from beam-specific measurements reported to layer 3 after beam consolidation or selection. A cell quality measurement may not be derived for reporting periods where the RS TXOP was missed for all the beams.

Layer 3 filtering for cell quality: filtering performed on the measurements provided may be Evaluation of reporting criteria: checks whether actual measurement reporting is necessary at point D. The evaluation may be based on more than one flow of measurements at reference point C e.g. to compare between different measurements. This is illustrated by input C and $C^1$. The evaluation may also be based on the detection of missed RS TXOPs. The UE may evaluate the reporting criteria at least every time a new measurement result is reported at point C, $C^1$ or when a missed RX TXOP is detected. The reporting criteria are standardized and the configuration is provided by RRC signaling (UE measurements).

D: measurement report information (message) sent on the radio interface.

L3 Beam filtering: filtering performed on the measurements (e.g. beam specific measurements) provided at point $A^1$. The behavior of the beam filters is standardized and the configuration of the beam filters is provided by RRC signaling. The layer 3 filtering is adapted such that the time characteristics of the filter a preserved when measurements samples are discarded. Filtering reporting period at E equals one measurement period at $A^1$.

E: a measurement (e.g. beam-specific measurement) after processing in the beam filter. The reporting rate may be identical to the reporting rate at point $A^1$. This measurement may be used as input for selecting the X measurements to be reported.

Beam Selection for beam reporting: selects the X measurements from the measurements provided at point E. The behavior of the beam selection may be standardized and the configuration of this module is provided by RRC signaling.

F: beam measurement information included in measurement report (sent) on the radio interface.

For the alternative where L1 discards the measurement sample that would have been a function of the "missed" input, disclosed herein is the behavior of the Beam Consolidation or Selection function as described in section 5.5.3.3 of 3GPP TS 38.331, Radio Resource Control (RRC) protocol specification (Release 15), V15.2.1. For alternatives where the discarding of the measurement sample that would have been a function of the "missed" input is performed by layer 3, it is proposed the Beam Consolidation or Selection function generates a cell measurement quantity if at least one beam measurement corresponds an RS TXOP that was not missed. If a missed RS TXOP is indicated for all the beam measurements, then a cell measurement quantity may not be generated. An exemplary description of Beam Consolidation or Selection function for this alternative is described in Table 22.

TABLE 22

| Exemplary Beam Consolidation/Selection function |
|---|
| The UE shall:<br>  1>    for each cell measurement quantity to be derived based on SS or PBCH block:<br>        2>    if a missed RS TXOP is indicated for all the beam measurements:<br>            3>    a cell measurement quantity is not generated.<br>        2>    else:<br>            3>    if nrofSS-BlocksToAverage in the associated measObject is not configured; or<br>            3>    if absThreshSS-BlocksConsolidation in the associated measObject is not configured; or<br>            3>    if the highest beam measurement quantity value is below absThreshSS-BlocksConsolidation:<br>                4>    derive each cell measurement quantity based on SS or PBCH block as the highest beam measurement quantity value, where eachbeam measurement quantity is described in [5]; ([5]-3GPP TS 38.215, NR; Physical layer measurements (Release 15), V15.2.0)<br>            3>    else:<br>                4>    derive each cell measurement quantity based on SS or PBCH block as the linear average of the power values of the highest beam measurement quantity values above absThreshSS-BlocksConsolidation where the total number of averaged beams shall not exceed nrofSS-BlocksToAverage;<br>            3>    apply layer 3 cell filtering as described herein;<br>  1>    for each cell measurement quantity to be derived based on CSI-RS:<br>        2>    if a missed RS TXOP is indicated for all the beam measurements:<br>            3>    a cell measurement quantity is not generated.<br>        2> else:<br>            3>    consider a CSI-RS resource to be applicable for deriving cell measurements when the concerned CSI-RS resource is included in the csi-rs-ResourceCellMobility including the physCellId of the cell in the CSI-RS-ConfigMobility in the associated measObject;<br>            3>    if nrofCSI-RS-ResourcesToAverage in the associated measObject is Not configured; or<br>            3>    if absThreshCSI-RS-Consolidation in the associated measObject is Not configured; or |

TABLE 22-continued

Exemplary Beam Consolidation/Selection function

```
       3>     if the highest beam measurement quantity value is below
              absThreshCSI-RS-Consolidation:
              4>     derive each cell measurement quantity based on
applicable CSI-RS resources for the cell as the highest beam measurement quantity value,
where each beam measurement quantity is described in [5];
       3>     else:
              4> derive each cell measurement quantity based on CSI-
RS as the linear average of the power values of the highest beam measurement quantity
values above absThreshCSI-RS-Consolidation where the total number of averaged beams
shall not exceed nroCSI-RS-ResourcesToAverage;
       3>     apply layer 3 cell filtering as described herein.
```

The L3 Cell Quality Filtering function may output a new measurement sample in response to receiving a Cell Quality sample from the Beam Consolidation or Selection Function. Similarly, the L3 Beam Filtering function may output a new measurement sample in response to receiving an L1 filtered beam measurement. The missed RS TXOP Indicator may be provided as an input to these functions to allow them to determine when a measurement sample was discarded.

In one example, the layer 3 filter does not generate a new output during reporting periods where a measurement sample is discarded. When a measurement sample is provided as an input to the layer 3 filter following one or more reporting periods where the measurement samples were discarded, the layer 3 filtering is adapted such that the time characteristics of the filter are preserved.

For example, if there is an assumption that a valid measurement was provided for measurement reporting periods n and (n-x), but discarded for all other measurement reporting periods in between, then the output of the layer 3 filter for sample n may be calculated as follows:

$$F_n = (1-a)^x \cdot F_{n-x} + a \cdot M_n$$

where:
$M_n$ is the latest received measurement result from the physical layer;
$F_n$ is the updated filtered measurement result, that is used for evaluation of reporting criteria or for measurement reporting;
$F_{n-x}$ is the old filtered measurement result calculated at time (n-x); and
$a = 1/2^{(k/4)}$, where k is the filterCoefficient for the corresponding measurement quantity received by the quantityConFIG.

An exemplary description of Layer 3 Filtering function for this alternative is described in Table 23.

TABLE 23

Exemplary Layer 3 Filtering Function

```
The UE shall:
  1>   for each cell measurement quantity and for each beam
       measurement quantity that the UE performs measurements
       according to 5.5.3.1 in [4]:
       2>    filter the measured result, before using for
             evaluation of reporting criteria or for
             measurement reporting, by the following formula:
                 F_n = (1 - a)^x · F_{n-x} + a · M_n
             where
             M_n is the latest received measurement
             result from the physical layer;
             F_n is the updated filtered measurement
             result, that is used for evaluation of reporting
             criteria or for measurement reporting;
```

TABLE 23-continued

Exemplary Layer 3 Filtering Function

```
             F_{n-x} is the last available filtered measurement
             result, where F_0 is set to M_1 when the
             first measurement result from the
             physical layer is received; and
             a = 1/2^{(k/4)}, where k is the filterCoefficient for
             the corresponding measurement
             quantity received by the quantityConfig;
       2>    adapt the filter such that the time
             characteristics of the filter
             are preserved at different input rates, observing
             that the filterCoefficient k assumes a sample
             rate equal to X ms; The value of X is
             equivalent to one intra-frequency L1
             measurement period as defined in [8] assuming
             non-DRX operation, and depends on
             frequency range. ([8] – 3GPP TS 38.133,
             Requirements for support of radio
             resource management (Release 15), V15.2.0)
```

Alternatively, the layer 3 filter calculates a new output during the measurement period where the sample was discarded. The layer 3 filter may use a scaled version of the sample $M_{n-1}$ for the value of the sample $M_n$ when performing the calculation; e.g. $M_n = c \cdot M_{n-1}$, where $0 \leq c \leq 1$). The value of c may be specified per the standard or signaled via higher layers; e.g. RRC signaling. The same layer 3 filter may be used for the L3 Beam Filtering function, but it may be configured using different filter coefficients.

In addition to the measurement events defined for NR, it is proposed to define new events for NR-U based on the detection of missed RS TXOPs, e.g. Event Ax (Missed RS TXOPs Detected for Serving Cell), Event Ay (Missed RS TXOPs detected for Neighbor Cell). The entering condition for such events may be based on the number of missed RS TXOPs detected during a given time period exceeding a configured threshold; and the leaving condition may be based on not detecting any missed RS TXOPs for a given timer period, where the parameters used for configuration of the event at the UE may be provided via higher layer signaling (e.g. RRC signaling) or specified per the standard. Exemplary definitions of the proposed events are shown in Table 24 and Table 25.

TABLE 24

Exemplary Event Ax (Missed RS TXOPs Detected For Serving Cell)

```
The UE shall:
  1>   consider the entering condition for this event to be satisfied
       when condition Ax-1, as specified below, is fulfilled;
  1>   consider the leaving condition for this event to be satisfied
       when condition Ax-2, as specified below, is fulfilled;
```

TABLE 24-continued

Exemplary Event Ax (Missed RS TXOPs Detected For Serving Cell)

```
1>    for this measurement, consider the NR
      serving cell corresponding to the
      associated measObjectNR associated with this event.
Inequality Ax-1 (Entering condition)
Ms > Thresh
Inequality Ax-2 (Leaving condition)
Ms = 0
The variables in the formula are defined as follows:
    Ms is the number of missed RS TXOPs detected
    during the timer period T.
    Thresh is the threshold parameter for this event (e.g.
ax-Threshold as defined within reportConfigNR for this event).
```

TABLE 25

Exemplary Event Ay (Missed RS TXOPs Detected for Neighbor Cell)

```
The UE shall:
    1>    consider the entering condition for this event to be satisfied
          when condition Ay-1, as specified below, is fulfilled;
    1>    consider the leaving condition for this event to be satisfied
          when condition Ay-2, as specified below, is fulfilled;
    1>    for this measurement, consider the NR serving
          cell corresponding to the associated
          measObjectNR associated with this event.
Inequality Ax-1 (Entering condition)
Mn > Thresh
Inequality Ax-2 (Leaving condition)
Mn = 0
The variables in the formula are defined as follows:
    Mn is the number of missed RS TXOPs detected
    during the timer period T.
    Thresh is the threshold parameter for this event (e.g.
ay-Threshold as defined within reportConfigNR for this event).
```

The UE may be configured to include beam measurement information in the measurement report. For reporting periods where the measurement sample is discarded for a given beam, the L3 filter may not generate a new output or the new output may calculate the new output based on the old samples. In any of the cases, the measurement result may inaccurate. To inform the gNB of this condition, as disclosed, it may be effective to include field in the beam measurement report to indicate whether or not the accuracy of the beam measurement might have been impacted due to discarded measurement samples. For example, the MeasQuantityResults IE may be extended to include a validity flag to indicate whether or not the measurement accuracy might have been impacted due to discarded measurement samples, as shown in Table 26. Alternatively, the UE may exclude such beam measurements from the measurement report.

TABLE 26

Exemplary NR-U MeasQuantityResults IE

```
MeasQuantityResults ::=    SEQUENCE {
    rsrp              RSRP-Range      OPTIONAL,
    rsrq              RSRQ-Range      OPTIONAL,
    sinr              SINR-Range      OPTIONAL,
    validityFlag      BOOLEAN         OPTIONAL,
}
```

The measurement configuration may include a parameter controlling when the UE is required to perform neighbor cell measurements. This parameter may be referred to as S-measure. S-measure may correspond to an SpCell quality threshold that is compared with the derived cell quality of the SpCell. The UE may be required to perform neighbor cell measurements when the derived SpCell quality is below S-measure. The derived SpCell quality may be based on SSB or CSI-RS reference signals.

For NR-U, metrics other than the derived SpCell quality may also be used to control when the UE is required to perform neighbor cell measurements. For example, the UE may trigger neighbor cell measurements when the number of missed RS TXOPs detected during a configured time interval exceeds a threshold. In another example, the RSSI or channel occupancy measurements performed on the serving cell frequency may be compare with a threshold to control when the UE is required to perform neighbor cell measurements. The thresholds used for the proposed examples may be signaled to the UE via higher layers, e.g. RRC signaling.

Such criteria may be used combination with the derived SpCell or on its own to control when the UE is required to perform neighbor cell measurements. For example, the UE may be configured to perform neighbor cell measurements if the SpCell quality is below a threshold or missed RS TXOPs are detected, the RSSI may above a threshold, the channel occupancy may above a threshold, etc.

An exemplary MeasConfigIE that includes the proposed parameters is shown in Table 27.

TABLE 27

Exemplary NR-U MeasConfig IE

```
MeasConfig ::= SEQUENCE {
    measObjectToRemoveList MeasObjectToRemoveList OPTIONAL, --
Need N
    measObjectToAddModList MeasObjectToAddModList OPTIONAL, --
Need N
    reportConfigToRemoveList ReportConfigToRemoveList OPTIONAL, --
Need N
    reportConfigToAddModList ReportConfigToAddModList
OPTIONAL, --Need N
    measIdToRemoveListMeasIdToRemoveListOPTIONAL, -- Need N
    measIdToAddModList MeasIdToAddModList OPTIONAL, -- Need N
    s-MeasureConfig SEQUENCE {
        SpCellQuality CHOICE {
            ssb-RSRP RSRP-Range,
            csi-RSRP RSRP-Range
        }           OPTIONAL, -- Need M
        missedTxopCount ENUMERATION {n1, n2, n4, n8} OPTIONAL, --
Need M
        rssi-Result INTEGER(0..76) OPTIONAL, -- Need M
        channelOccupancy INTEGER(0..100) OPTIONAL, -- Need M
    }
    quantityConfig QuantityConfig OPTIONAL, -- Need M
    measGapConfig MeasGapConfig OPTIONAL, -- Need M
    measGapSharingConfig MeasGapSharingConfig OPTIONAL, --
Need M
}
MeasObjectToRemoveList ::= SEQUENCE (SIZE
(1..maxNrofObjectId)) OF
MeasObjectId
MeasIdToRemoveList ::= SEQUENCE (SIZE (1..maxNrofMeasId))
OF MeasId
ReportConfigToRemoveList ::= SEQUENCE (SIZE
(1..maxReportConfigId)) OF
ReportConfigId
```

Figure 7:
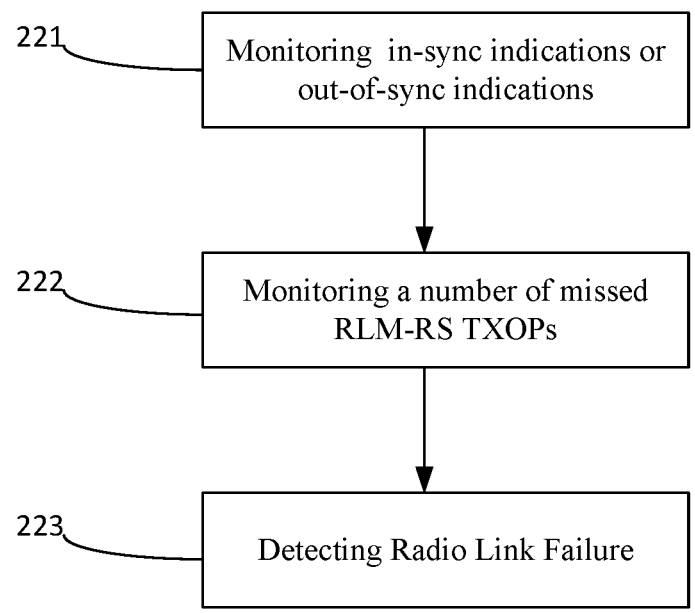
FIG. 7 illustrates an exemplary method for implementing RLM and RRM measurement.

FIG. 7 illustrates an exemplary method for implementing the disclosed subject matter. At step 221, there may be a monitoring of in-sync indications or out-of-sync indications. The in-sync indications or the out-of-sync indications may be based on a radio link quality. At step 222, there may be monitoring of number of missed RLM-RS TXOPs. At step 223, based on the monitored in-sync indications or out-of-sync indications in combination with the monitored number of missed RLM-RS TXOPs, a user equipment may detect a radio link failure. The monitoring of the number of missed RLM-RS TXOPs may be based on a discovery reference signal, channel access indication, or another signal. One or more of the out-of-sync indications may be generated when at least one of the missed RLM-RS TXOPs may be detected. The timer $T_{Evaluate\_missed\_TXOP}$ may be set to an initial value and then count down. Expiration of the timer may correspond to the timer reaching a zero value. Further additions to this method flow may be based on Table 1-Table 27 and the corresponding discussions.

Table 28 provides example acronyms that may appear in the description. Unless otherwise specified, the acronyms used herein refer to the corresponding terms listed in Table 28:

TABLE 28

| | |
|---|---|
| BA | Bandwidth Adaption |
| BLER | Block Error Rate |
| BWP | Bandwidth Part |
| CAI | Channel Access Indication |
| CORESET | Control Resource Set |
| COT | Channel Occupancy Time |
| C-RNTI | Cell Radio-Network Temporary Identifier |
| CSI-RS | Channel State Information Reference Signals |
| DCI | Downlink Control Information |
| DL | Downlink |
| DL-RS | Downlink Reference Signal |
| DRS | Discovery Reference Signal |
| DwPTS | Downlink Pilot Timeslot |
| eNB | Evolved Node B |
| FDM | Frequency Division Multiplexing |
| gNB | NR NodeB |
| IE | Information Element |
| IS | In-Sync |
| L1 | Layer 1 |
| L2 | Layer 2 |
| L3 | Layer 3 |
| LAA | License Assisted Access |
| LBT | Listen-Before-Talk |
| LTE | Long Term Evolution |
| MAC | Medium Access Control |
| MCG | Master Cell Group |
| NR | New Radio |
| NR-U | NR Unlicensed |
| OOS | Out-of-Sync |
| PCell | Primary Cell |
| PDCCH | Physical Downlink Control Channel |
| PHY | Physical Layer |
| PSCell | Primary Secondary Cell |
| RAN | Radio Access Network |
| RLC | Radio Link Control |
| RLF | Radio Link Failure |
| RLM | Radio Link Monitoring |
| RNTI | Radio Network Temporary Identifier |
| RRC | Radio Resource Control |
| RRM | Radio Resource Management |
| RS | Reference Signal |
| RSRP | Reference Signal Received Power |
| RSRQ | Reference Signal Received Quality |
| RSSI | Received Signal Strength Indicator |
| RX | Receive |
| SCell | Secondary Cell |
| SCG | Secondary Cell Group |
| SI | System Information |
| SINR | Signal-to-Noise and Interference Ratio |
| SpCell | Special Cell |
| SS | Synchronization Signal |
| SSB | SS Block |
| TDM | Time Division Multiplexing |
| TRP | Transmission and Reception Point |
| TXOP | Transmission Opportunity |
| UE | User Equipment |
| UL | Uplink |

It is understood that the entities performing the steps illustrated herein, such as Table 1-Table 27 or FIG. 4-FIG. 7, among others, may be logical entities. The steps may be stored in a memory of, and executing on a processor of, a user equipment, server, or computer system such as those illustrated in FIG. 9C or FIG. 9D. Skipping steps, combining steps, or adding steps between exemplary methods disclosed herein is contemplated.

Figure 8:
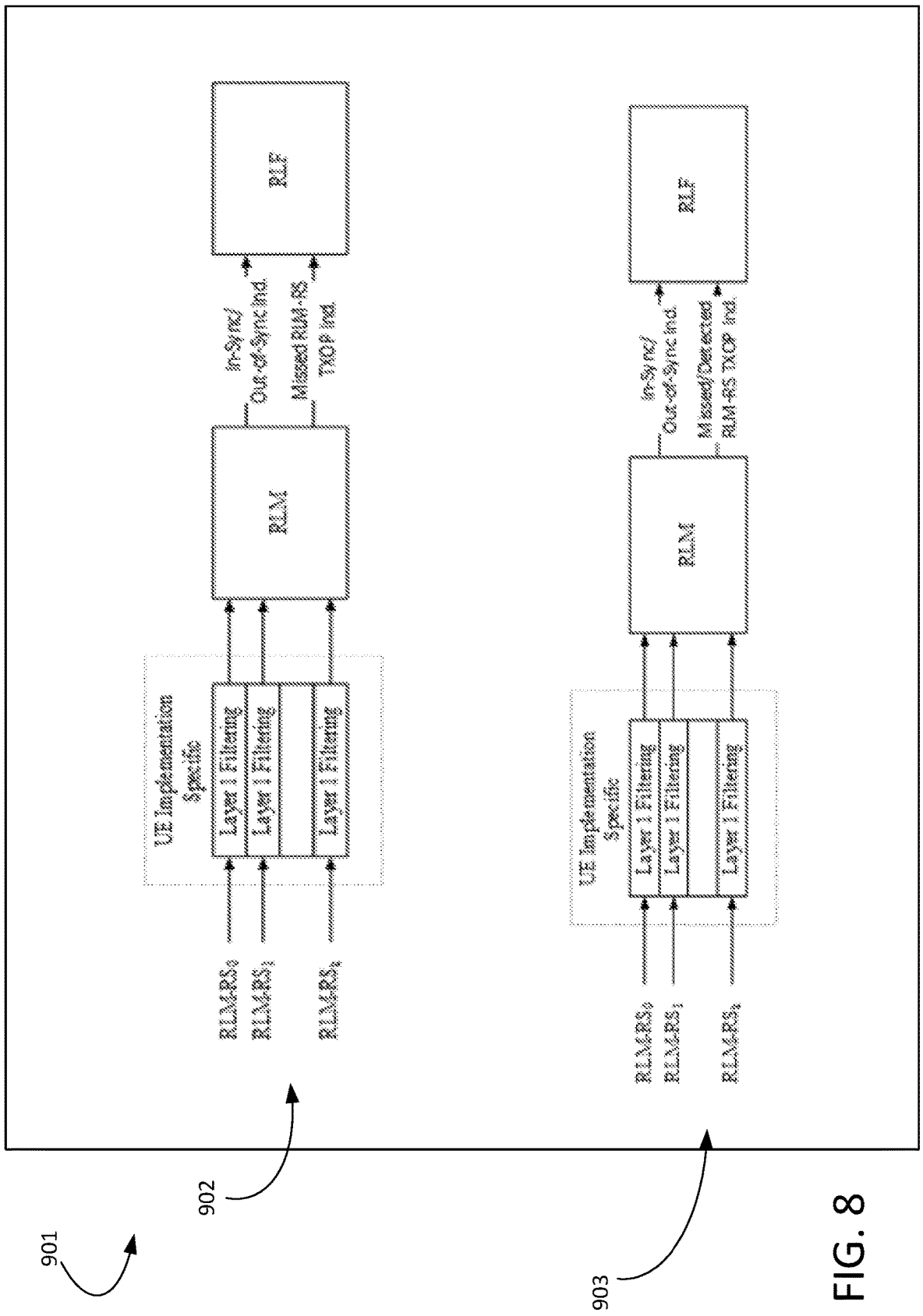
FIG. 8 illustrates an exemplary display (e.g., graphical user interface) that may be generated based on the methods, systems, and devices of mobility signaling load reduction.

FIG. 8 illustrates an exemplary display (e.g., graphical user interface) that may be generated based on the methods, systems, and devices of radio link monitoring and radio resource management measurement procedures for NR-U, as discussed herein. Display interface 901 (e.g., touch screen display) may provide text in block 902 associated with radio link monitoring and radio resource management measurement procedures for NR-U, such as method flows and RRC related parameters, among other things. Progress of any of the steps (e.g., sent messages or success of steps) discussed herein may be displayed in block 902. In addition, graphical output 902 may be displayed on display interface 901. Graphical output 903 may be the topology of the devices implementing the methods, systems, and devices of radio link monitoring and radio resource management measurement procedures for NR-U, a graphical output of the progress of any method or systems discussed herein, or the like.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multiperson video calls, autonomous driving, augmented reality, tactile internet, virtual reality, home automation, robotics, and aerial drones to name a few. All of these use cases and others are contemplated herein.

Figure 9A:
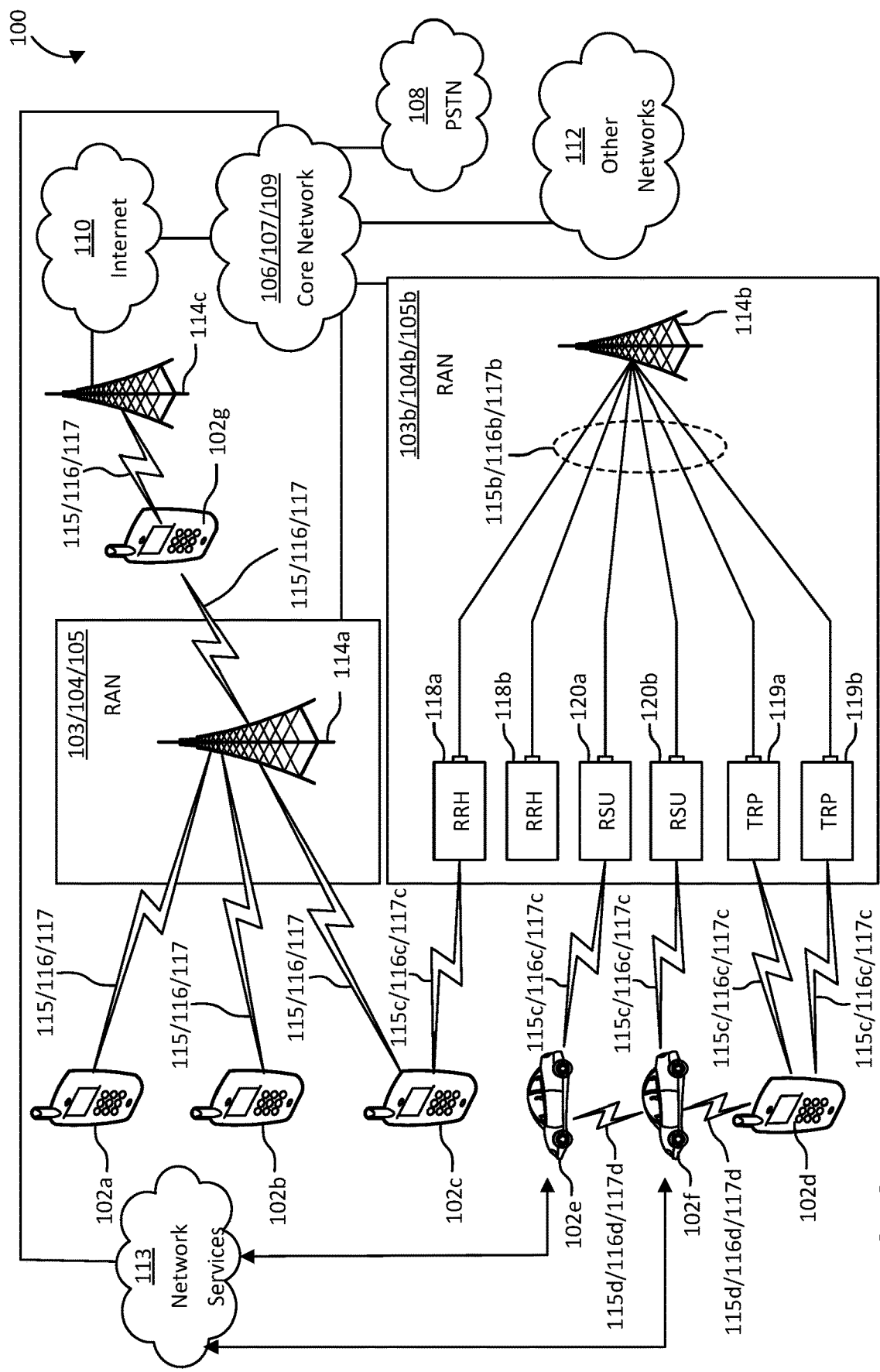
FIG. 9A illustrates an example communications system.

FIG. 9A illustrates an example communications system 100 in which the methods and apparatuses of radio link monitoring and radio resource management measurement procedures for NR-U, such as the systems and methods illustrated in FIG. 4 through FIG. 6 described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 9A, FIG. 9B, FIG. 9C, FIG. 9D, FIG. 9E, or FIG. 9F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 9A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of radio link monitoring and radio resource management measurement procedures for NR-U, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 9A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of radio link monitoring and radio resource management measurement procedures for NR-U, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 9A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 9A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of radio link monitoring and radio resource management measurement procedures for NR-U, as disclosed herein. For example, the WTRU 102g shown in FIG. 9A may be configured to communicate with the base station 114a, which may employ a cellular-based radio technology, and with the base station 114c, which may employ an IEEE 802 radio technology.

Although not shown in FIG. 9A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network.

For example, the ideas that apply to the wireless interfaces 115, 116, 117 and 115c/116c/117c may equally apply to a wired connection.

Figure 9B:
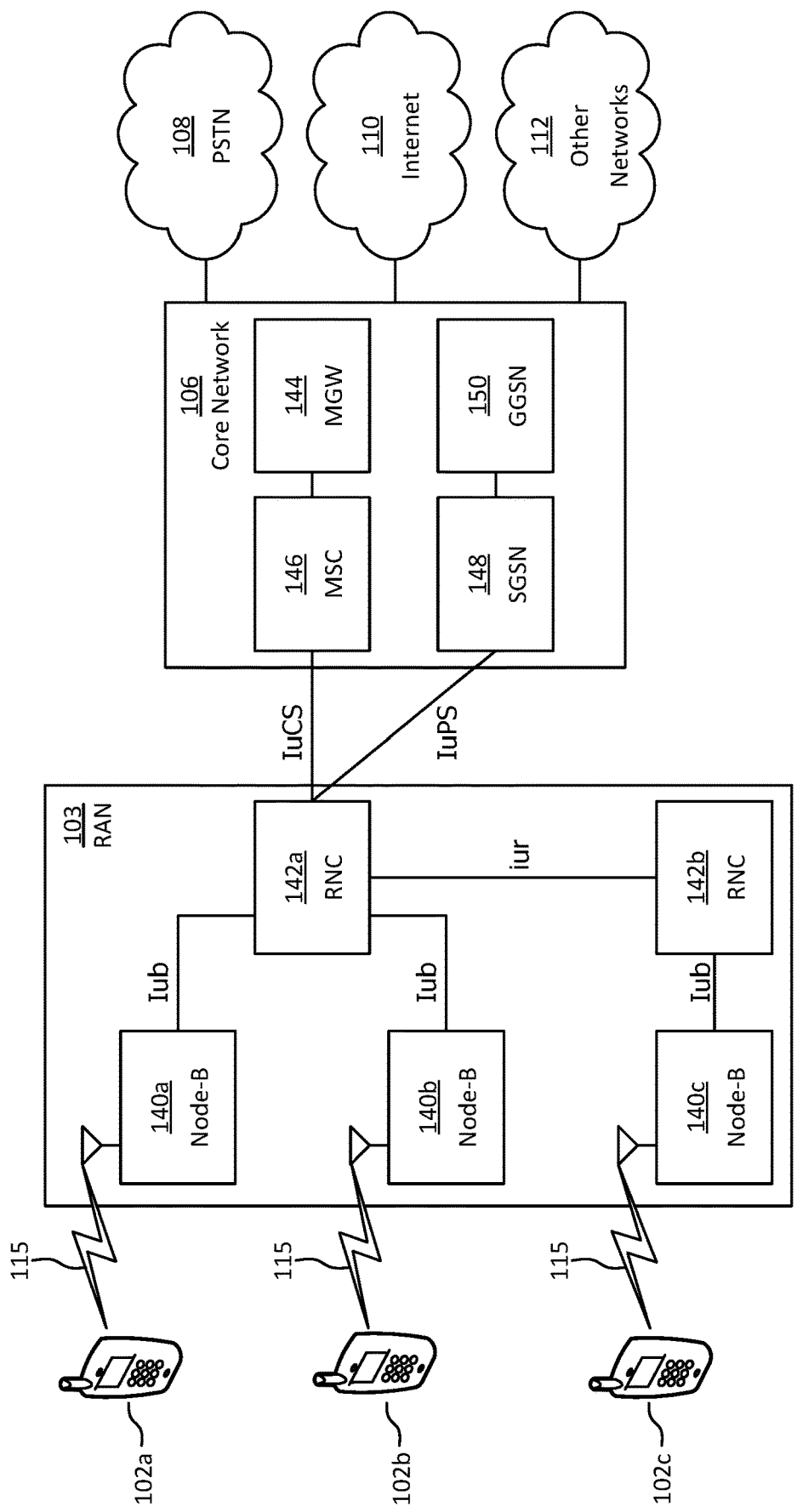
FIG. 9B illustrates an exemplary system that includes RANs and core networks.

FIG. 9B is a system diagram of an example RAN 103 and core network 106 that may implement methods, systems, and devices of radio link monitoring and radio resource management measurement procedures for NR-U, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 9B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 9B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 9B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 9C:
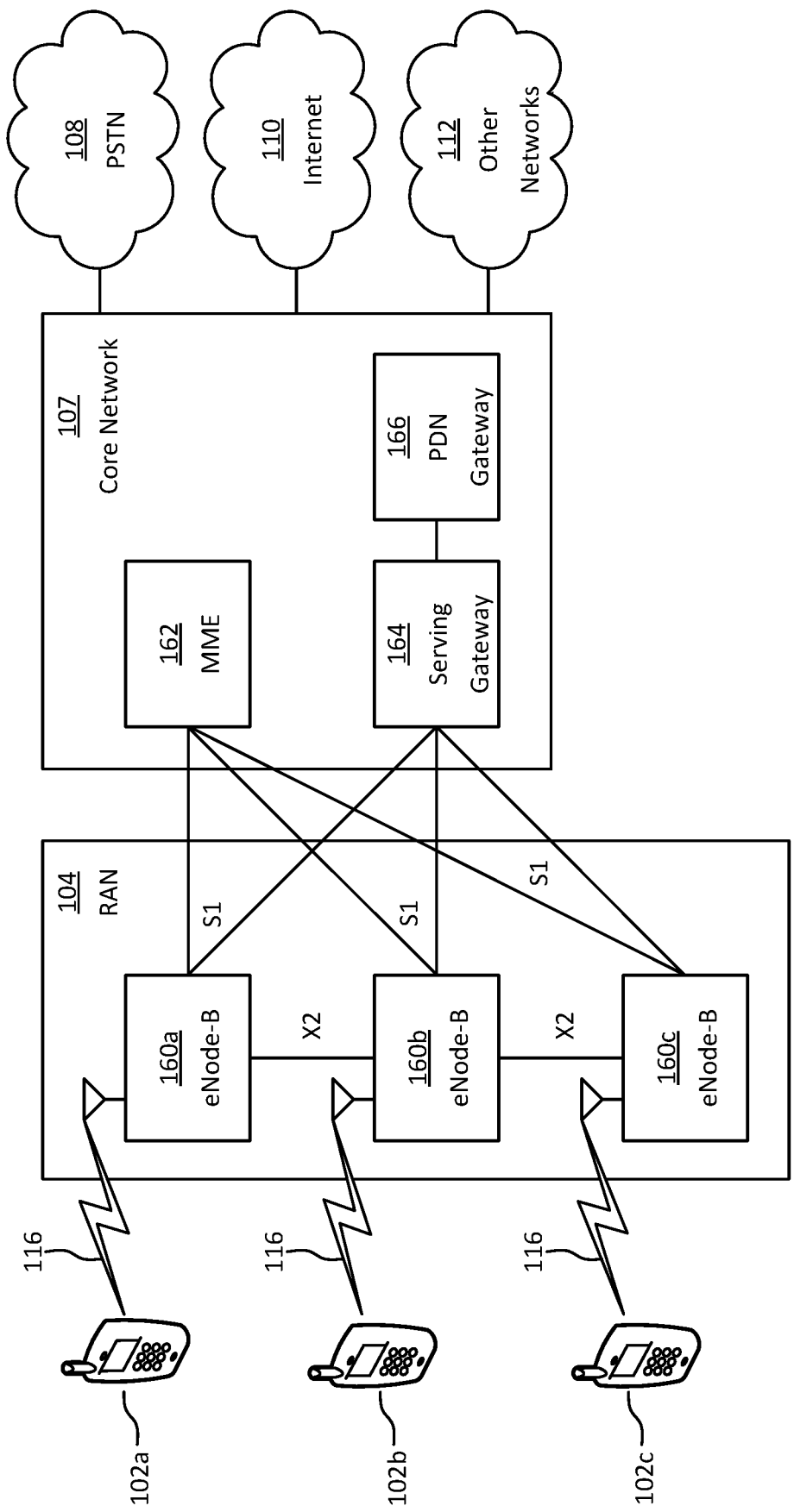
FIG. 9C illustrates an exemplary system that includes RANs and core networks.

FIG. 9C is a system diagram of an example RAN 104 and core network 107 that may implement methods, systems, and devices of radio link monitoring and radio resource management measurement procedures for NR-U, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 9C, the eNode-Bs 160a, 160b, and 160c may communicate with one another over an X2 interface.

The core network 107 shown in FIG. 9C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 9D:
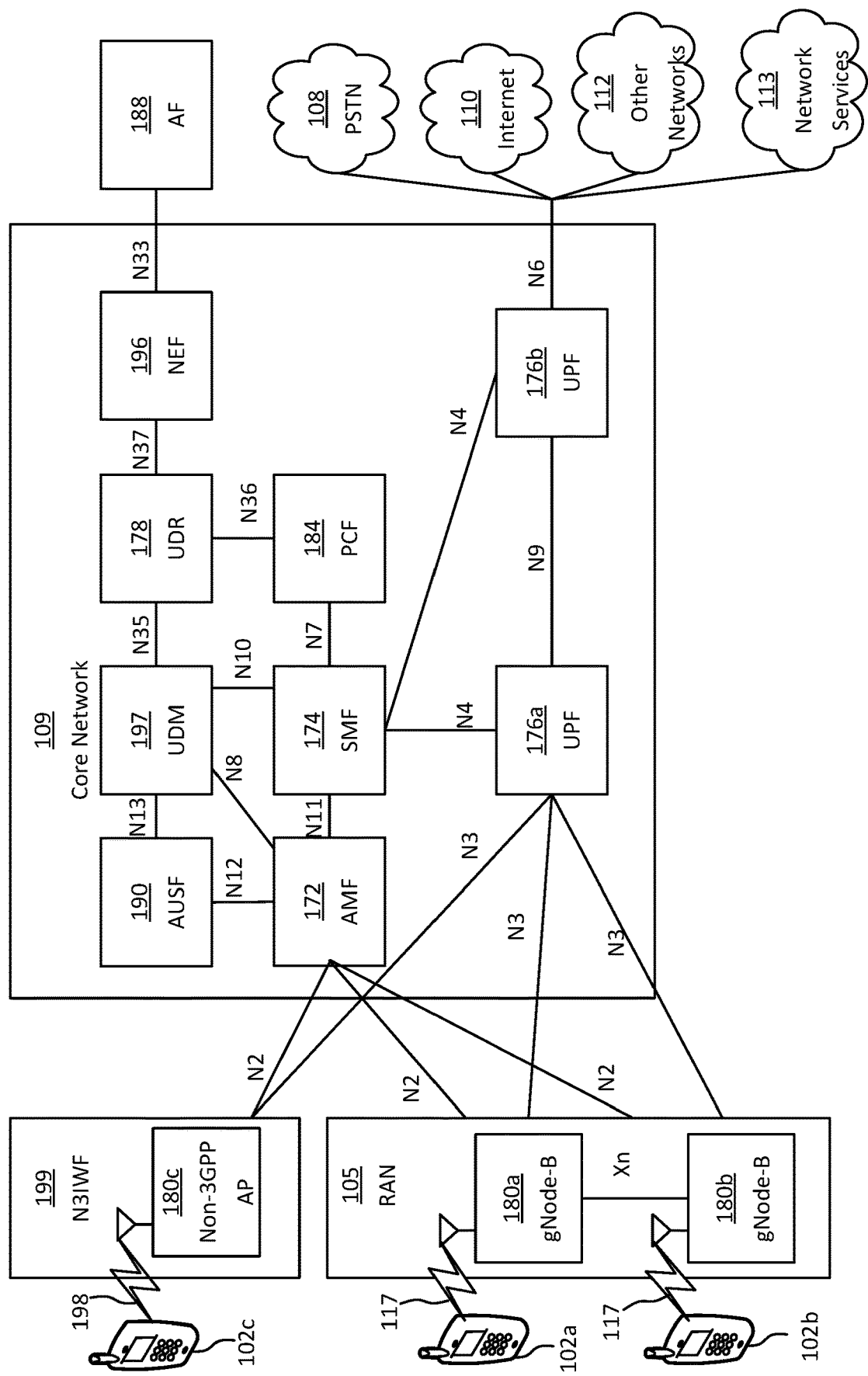
FIG. 9E illustrates another example communications system.
FIG. 9F is a block diagram of an example apparatus or device, such as a WTRU.
FIG. 9G is a block diagram of an exemplary computing system.

FIG. 9D is a system diagram of an example RAN 105 and core network 109 that may implement methods, systems, and devices of radio link monitoring and radio resource management measurement procedures for NR-U, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 9D, the gNode-Bs 180a and 180b may communicate with one another over an Xn interface, for example.

The core network 109 shown in FIG. 9D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 9G.

In the example of FIG. 9D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 9D shows that network functions directly connect to one another, however, it should be appreciated that they may communicate via routing agents such as a diameter routing agent or message buses.

In the example of FIG. 9D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 9D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 9D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 9D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 9A, FIG. 9C, FIG. 9D, or FIG. 9E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 9A, FIG. 9B, FIG. 9C, FIG. 9D, or FIG. 9E are provided by way of example only, and it is understood that the subject matter disclosed and claimed herein may be embodied or implemented in any similar communication system, whether presently defined or defined in the future.

Figure 9E:
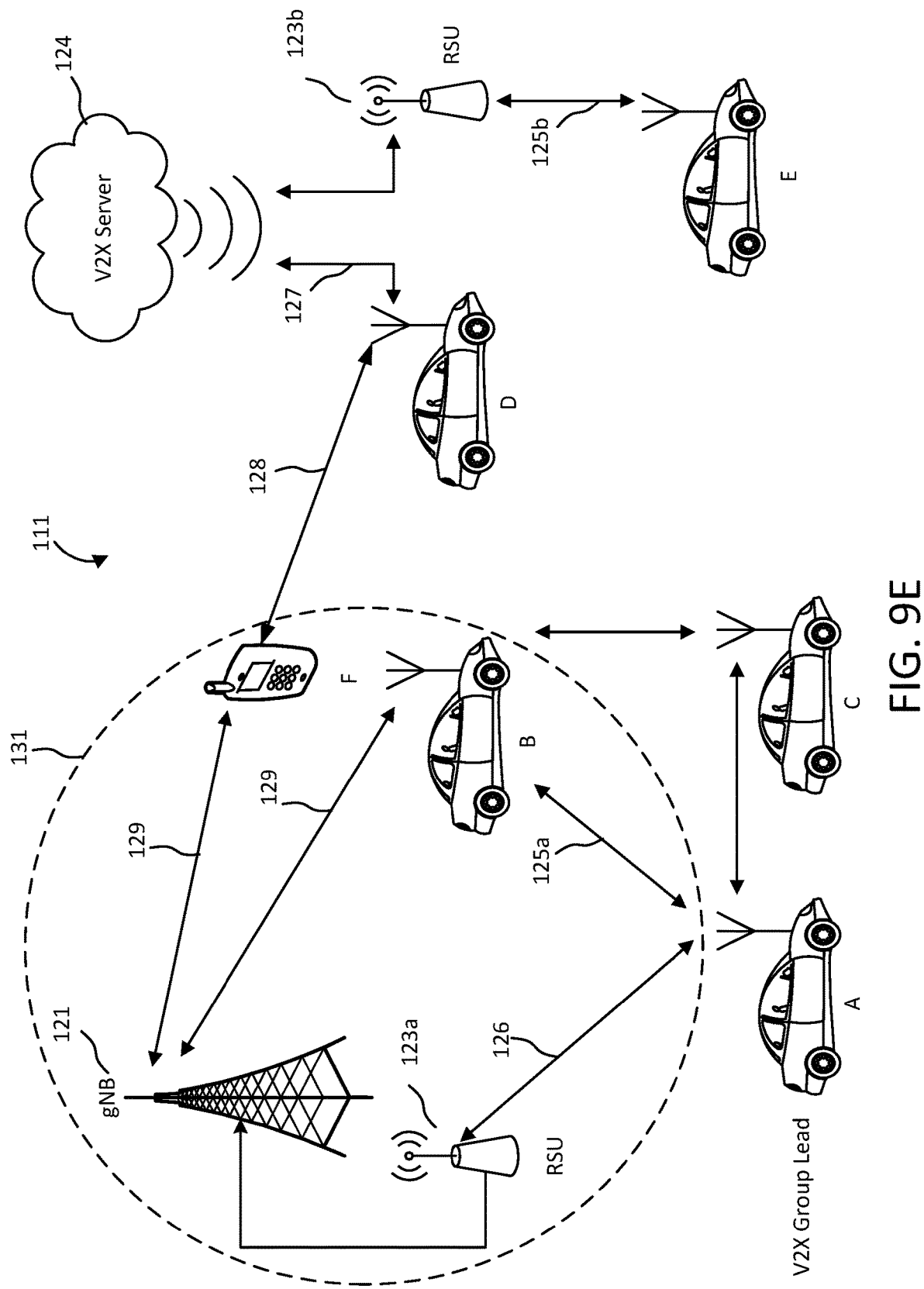

FIG. 9E illustrates an example communications system 111 in which the systems, methods, apparatuses that implement radio link monitoring and radio resource management measurement procedures for NR-U, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 9E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 9E, WRTU D, which is outside of the access network coverage 131, communicates with WTRU F, which is inside the coverage 131.

WTRUs A, B, C, D, E, and F may communicate with RSU 123*a* or 123*b* via a Vehicle-to-Network (V2N) 133 or Sidelink interface 125*b*. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 9F:
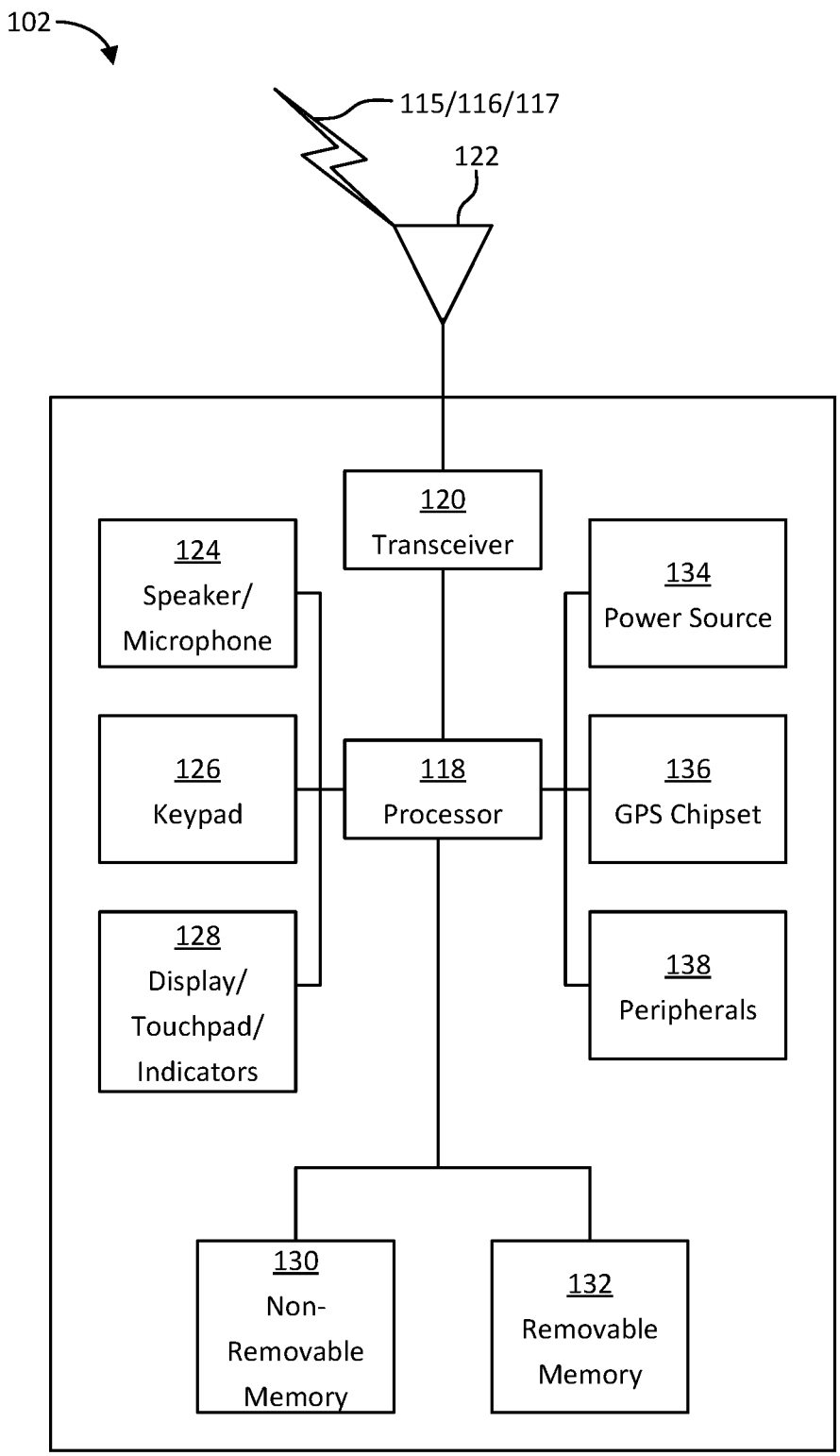

FIG. 9F is a block diagram of an example apparatus or device WTRU 102 that may be configured for wireless communications and operations in accordance with the systems, methods, and apparatuses that implement radio link monitoring and radio resource management measurement procedures for NR-U, described herein, such as a WTRU 102 of FIG. 9A, FIG. 9B, FIG. 9C, FIG. 9D, or FIG. 9E, or FIG. 4-FIG. 6. As shown in FIG. 9F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114*a* and 114*b*, or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 9F and may be an exemplary implementation that performs the disclosed systems and methods for radio link monitoring and radio resource management measurement procedures for NR-U described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 9F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114*a* of FIG. 9A) over the air interface 115/116/117 or another UE over the air interface 115*d*/116*d*/117*d*. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 9F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the radio link monitoring and radio resource management measurement procedures for NR-U in some of the examples described herein are successful or unsuccessful, or otherwise indicate a status of radio link monitoring and radio resource management measurement procedures for NR-U and associated components. The control lighting patterns, images, or colors on the display or indicators 128 may be reflective of the status of any of the method flows or components in the FIG.'S illustrated or discussed herein (e.g., FIG. 4-FIG. 6, etc). Disclosed herein are messages and procedures of radio link monitoring and radio resource management measurement procedures for NR-U. The messages and procedures may be extended to provide interface/API for users to request resources via an input source (e.g., speaker/microphone 124, keypad 126, or display/touchpad/indicators 128) and request, configure, or query radio link monitoring and radio resource management measurement procedures for NR-U related information, among other things that may be displayed on display 128.

The processor 118 may receive power from the power source 134, and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 9G:
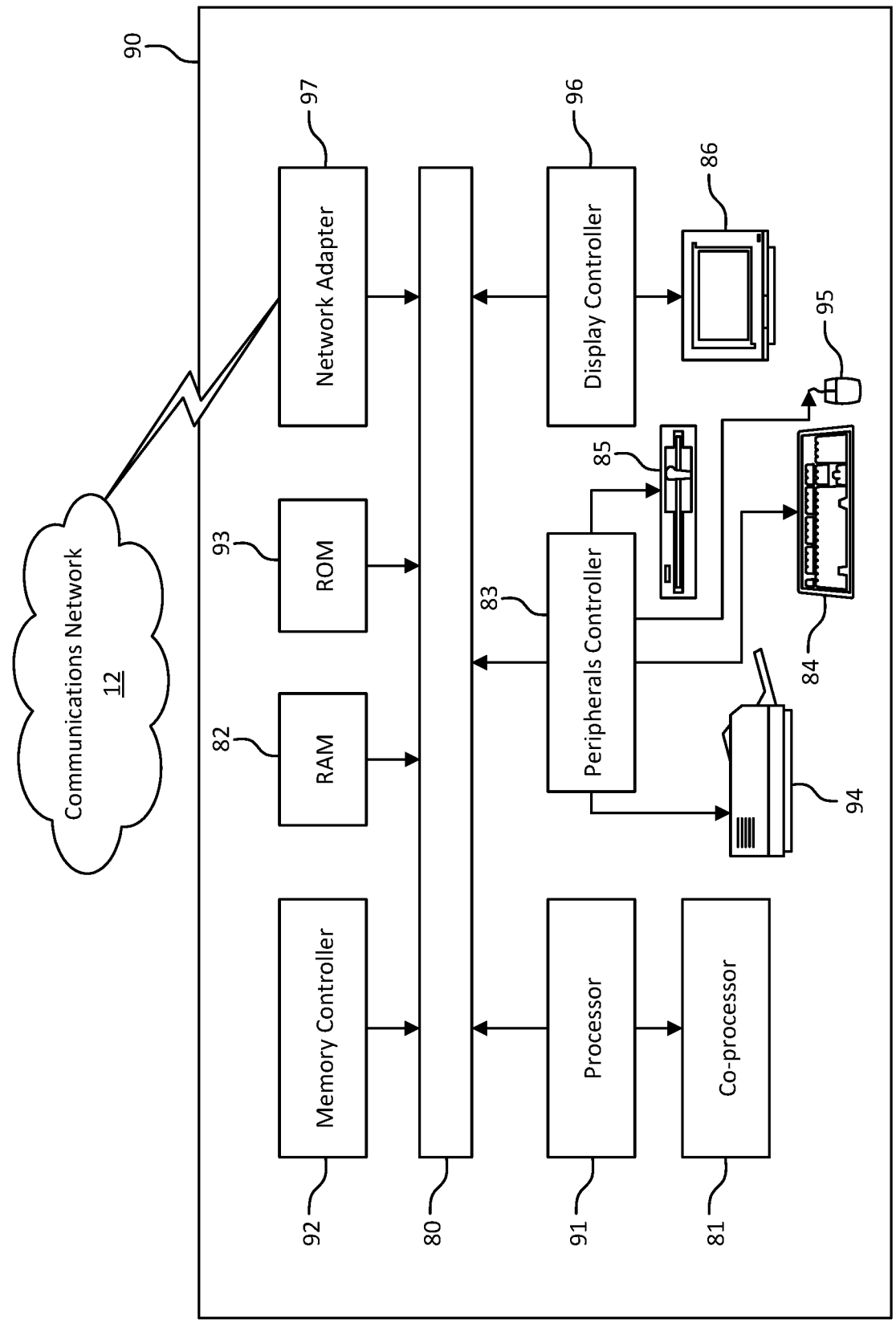

FIG. 9G is a block diagram of an exemplary computing system 90 in which one or more apparatuses of the communications networks illustrated in FIG. 9A, FIG. 9C, FIG. 9D and FIG. 9E as well as radio link monitoring and radio resource management measurement procedures for NR-U, such as the systems and methods illustrated in FIG. 4 through FIG. 6 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for radio link monitoring and radio resource management measurement procedures for NR-U, such as monitoring signals or frames.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 9A, FIG. 9B, FIG. 9C, FIG. 9D, or FIG. 9E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—radio link monitoring and radio resource management measurement procedures for NR-U—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for radio link monitoring and radio resource management measurement procedures for NR-U. A method, system, computer readable storage medium, or apparatus has means for monitoring a downlink link quality based on a reference signal in one or more configured Radio Link Monitoring Reference Signal (RLM-RS) resources; monitoring (e.g., counting) a number of missed Radio Link Monitoring Reference Signal (RLM-RS) Transmission Opportunities (TXOPs); and determining (e.g., detected) Radio Link Failure (RLF) based on the monitored downlink link quality in combination with the monitored number of missed RLM-RS TXOPs. When RLF is detected, the UE may initiate the RRC Connection Re-Establishment procedure. The downlink link quality may be based on a set of one or more RLM reference signals. The downlink radio link quality may be measured for a specific reference signal. The UE may only perform RLM for the DL. The UE may estimate the downlink radio link quality and compare it to the thresholds Qout (e.g., out-of-sync) and Qin (e.g., in-sync) for the purpose of monitoring downlink radio link quality of the cell. In an example, Qin is the threshold above which in-sync is declared and Qout is the threshold below which out-of-sync is declared The gNB may make use of other reference signals (e.g. SRS or DMRS to determine the UL quality). The quality measurements may correspond to an RSRP or RSRQ measurement as defined per the 3GPP specs. All combinations in this paragraph and the below paragraph (including the removal or addition of steps) are contemplated in a manner that is consistent with the other portions of the detailed description.

A method, system, computer readable storage medium, or apparatus has means for monitoring in-sync indications or out-of-sync indications, wherein the in-sync indications or the out-of-sync indications are based on a radio link quality; monitoring a number of missed radio link monitoring reference signal (RLM-RS) transmission opportunities (TXOPs); and based on the monitored in-sync indications or out-of-sync indications in combination with the monitored number of missed RLM-RS TXOPs, determining (e.g., detecting) radio link failure (RLF). The monitoring of the number of missed RLM-RS TXOPs may be based on a discovery reference signal, channel access indication, or another signal. The method, system, computer readable storage medium, or apparatus has means for when there is a licensed band downlink available, detecting whether the unlicensed channel was acquired during the RLM-RS TXOP based on downlink control information (DCI) obtained on the licensed band downlink. The monitoring the number of missed RLM-RS TXOPs may be based on frames of a physical layer in which radio link quality is assessed. The monitoring the number of missed RLM-RS TXOPs may be based on when NMissed_TXOP are received within TEvaluate_missed_TXOP period. The method, system, computer readable storage medium, or apparatus has means for when a RLM-RS TXOP is missed or when the RLM-RS is detected as transmitted during the RLM-RS TXOP, providing an indication that the RLM-RS TXOP was missed to a higher layer. RRC is an example of a higher layer. The signaling between peer RRC entities in a UE or gNB may be considered RRC signaling. The method, system, computer readable storage medium, or apparatus has means for activating (e.g., starting) timer TEvaluate_missed_TXOP, based on detecting NMissed_TXOP consecutive missed RLM-RS TXOPs; stopping timer TEvaluate_missed_TXOP, based on detecting RLM-RSs during Ndetected_TXOP consecutive RLM-RS TXOPs; and when timer TEvaluate_missed_TXOP is not stopped and timer TEvaluate_missed_TXOP is expired, determining that there is a radio link failure. The TEvaluate_missed_TXOP, NMissed_TXOP, or Ndetected_TXOP may be signaled by RRC signaling or another higher layer. One or more of the out-of-sync indications may be generated when at least one of the missed RLM-RS TXOPs may be detected. The timer T312 may be set to an initial value and then count down. Expiration of the timer may correspond to the timer reaching a zero value. The detecting of the radio link failure may further be based on receiving N310 consecutive out-of-sync indications. The method, system, computer readable storage medium, or apparatus has means for starting timer $T_{Evaluate\_missed\_TXOP}$, based on detecting of a missed RLM-RS TXOPs while timer $T_{Evaluate\_missed\_TXOP}$ is not running;

stopping timer $T_{Evaluate\_missed\_TXOP}$, based on detecting RLM-RSs during $N_{detected\_TXOP}$ consecutive RLM-RS TXOPs; and when timer $T_{Evaluate\_missed\_TXOP}$ is not stopped and timer $T_{Evaluate\_missed\_TXOP}$ is expired, determining that there is a radio link failure. The detecting of the radio link failure may be based on receiving maximum number of consecutive out-of-sync indications for a PCell from lower layers. The method, system, computer readable storage medium, or apparatus has means for using a higher layer to increment counter N310 based on receiving at least one of the out-of-sync indication; and detecting the radio link failure based further on when a maximum value is reached; and resetting the counter N310 upon receiving N311 consecutive in-sync indications. The method, system, computer readable storage medium, or apparatus has means for when an RLM-RS TXOP is missed, providing an indication that the RLM-RS TXOP was missed to a higher layer. An indication of detected RLM-RS TXOPs may be provided to higher layers. RLF may detected upon $T_{Evaluate\_missed\_TXOP}$ expiry. $T_{Evaluate\_missed\_TXOP}$ may be started upon receiving $N_{Missed\_TXOP}$ consecutive missed RLM-RS TXOPs indications from lower layers, and may be stopped upon receiving indications of detection of RLM-RSs during $N_{detected\_TXOP}$ consecutive RLM-RS TXOPs from lower layers. The monitoring may occur even when the number of missed RLM-RS TXOPs received within $T_{Evaluate\_missed\_TXOP}$ period is less than $N_{Missed\_TXOP}$. The maximum value may correspond to a maximum count of out-of-sync indications. The counter N310 may be incremented or reset based on whether out-of-sync or in-sync indications are received. When the maximum count is reached, RLF may be declared. The method, system, computer readable storage medium, or apparatus has means for starting timer $T_{Evaluate\_missed\_TXOP}$, based on detecting of a missed RLM-RS TXOPs while timer $T_{Evaluate\_missed\_TXOP}$ is not running; stopping timer $T_{Evaluate\_missed\_TXOP}$, based on detecting RLM-RSs during Ndetected_TXOP consecutive RLM-RS TXOPs; and when timer $T_{Evaluate\_missed\_TXOP}$ is running, receiving $N_{Missed\_TXOP}$ consecutive missed RLM-RS TXOPs indications from lower layers, determining that there is a radio link failure. All combinations in this paragraph (including the removal or addition of steps) are contemplated in a manner that is consistent with the other portions of the detailed description.

What is claimed is:

1. A wireless transmit/receive unit (WTRU) for performing a radio link monitoring or radio link failure process, the WTRU comprising:
   a processor; and
   a memory coupled with the processor, the memory comprising executable instructions stored thereon that when executed by the processor cause the processor to effectuate operations comprising:
   monitoring in-sync indications or out-of-sync indications on an unlicensed channel, wherein the in-sync indications or the out-of-sync indications are based on a radio link quality;
   monitoring a number of missed radio link monitoring reference signal (RLM-RS) transmission opportunities (TXOPs) on the unlicensed channel, wherein the monitoring of the number of missed RLM-RS TXOPs comprises:
   detecting whether the unlicensed channel was acquired during the RLM-RS TXOP based on a channel access indication (CAI) signal, the CAI signal indicating to the WTRU that the unlicensed channel was acquired or, when there is a licensed band downlink available, based on downlink control information (DCI) obtained on the licensed band downlink; and
   based on the monitored in-sync indications or out-of-sync indications in combination with the monitored number of missed RLM-RS TXOPs, determining radio link failure (RLF).

2. The WTRU of claim 1, wherein the monitoring of the number of missed RLM-RS TXOPs is based on a signal transmitted by a base station, wherein the base station is a gNB.

3. The WTRU of claim 1, wherein the monitoring of the number of missed RLM-RS TXOPs is based on a discovery reference signal.

4. The WTRU of claim 1, wherein the monitoring the number of missed RLM-RS TXOPs is based on frames of a physical layer in which radio link quality is assessed.

5. The WTRU of claim 1, wherein the monitoring the number of missed RLM-RS TXOPs is based on detecting $N_{missed\_TXOP}$ missed RLM-RS TXOPs within $T_{Evaluate\_missed\_TXOP}$ period.

6. The WTRU of claim 1, the operations further comprising when an RLM-RS TXOP is missed, providing an indication that the RLM-RS TXOP was missed to a higher layer.

7. The WTRU of claim 1, the operations further comprising:
   starting timer $T_{Evaluate\_missed\_TXOP}$, based on detecting of missed RLM-RS TXOPs while timer $T_{Evaluate\_missed\_TXOP}$ is not running;
   stopping timer $T_{Evaluate\_missed\_TXOP}$, based on detecting RLM-RSs during $N_{detected\_TXOP}$ consecutive RLM-RS TXOPs, wherein $N_{detected\_TXOP}$ is a predetermined threshold number for detected RLM-RS TXOPs; and
   when timer $T_{Evaluate\_missed\_TXOP}$ missed is running, receiving $N_{Missed\_TXOP}$ consecutive missed RLM-RS TXOPs indications from lower layers, wherein $N_{missed\_TXOP}$ is a predetermined threshold number of missed RLM-RS TXOPs, determining that there is a radio link failure.

8. The WTRU of claim 7, wherein the $T_{Evaluate\_missed\_TXOP}$, $N_{Missed\_TXOP}$, or $N_{detected\_TXOP}$ is signaled by RRC signaling.

9. The WTRU of claim 1, the operations further comprising:
   starting timer $T_{Evaluate\_missed\_TXOP}$ based on receiving $N_{missed\_TXOP}$ consecutive missed RLM-RS TXOPs indications from lower layers, wherein $N_{missed\_TXOP}$ is a predetermined threshold number of missed RLM-RS TXOPs;
   stopping timer $T_{Evaluate\_missed\_TXOP}$ based on detecting RLM-RSs during $N_{detected\_TXOP}$ consecutive RLM-RS TXOPs from lower layers, wherein $N_{detected\_TXOP}$ is a predetermined threshold number for detected RLM-RS TXOPs; and
   when timer $T_{Evaluate\_missed\_TXOP}$ is not stopped and timer $T_{Evaluate\_missed\_TXOP}$ is expired, determining that there is a radio link failure.

10. The WTRU of claim 1, wherein the determining of the radio link failure is further based on receiving maximum number of consecutive out-of-sync indications for a PCell from lower layers.

11. A method of operating a wireless transmit/receive unit (WTRU) for performing a radio link monitoring or radio link failure process, the method comprising:
   monitoring in-sync indications or out-of-sync indications, wherein the in-sync indications or the out-of-sync indications are based on a radio link quality;

monitoring a number of missed radio link monitoring reference signal (RLM-RS) transmission opportunities (TXOPs) on the unlicensed channel, wherein the monitoring of the number of missed RLM-RS TXOPs comprises:
  detecting whether the unlicensed channel was acquired during the RLM-RS TXOP based on a channel access indication (CAI) signal, the CAI signal indicating to the WTRU that the unlicensed channel was acquired or, when there is a licensed band downlink available, based on downlink control information (DCI) obtained on the licensed band downlink; and
based on the monitored in-sync indications or out-of-sync indications in combination with the monitored number of missed RLM-RS TXOPs, determining radio link failure (RLF).

12. The method of claim 11, further comprising:
starting timer $T_{Evaluate\_missed\_TXOP}$, based on detecting of a missed RLM-RS TXOPs while timer $T_{Evaluate\_missed\_TXOP}$ is not running;
stopping timer $T_{Evaluate\_missed\_TXOP}$, based on detecting RLM-RSs during $N_{detected\_TXOP}$ consecutive RLM-RS TXOPs, wherein $N_{detected\_TXOP}$ is a predetermined threshold number for detected RLM-RS TXOPs; and
when timer $T_{Evaluate\_missed\_TXOP}$ is not stopped and timer $T_{Evaluate\_missed\_TXOP}$ is expired determining that there is a radio link failure.

13. The method of claim 11, wherein the monitoring of the number of missed RLM-RS TXOPs is based on a signal transmitted by a base station, wherein the base station is a gNB.

14. The method of claim 11, wherein the monitoring the number of missed RLM-RS TXOPs is based on frames of a physical layer in which radio link quality is assessed.

15. The method of claim 11, further comprising when an RLM-RS TXOP is missed, providing an indication that the RLM-RS TXOP was missed to a higher layer.

* * * * *

UNITED STATES PATENT AND TRADEMARK OFFICE
CERTIFICATE OF CORRECTION

PATENT NO. : 12,052,590 B2
APPLICATION NO. : 17/265973
DATED : July 30, 2024
INVENTOR(S) : Joseph M. Murray et al.

It is certified that error appears in the above-identified patent and that said Letters Patent is hereby corrected as shown below:

In the Claims

In Claim 1: Column 43, Line 67, delete "or, when there is a licensed"

In Claim 1: Column 44, Line 1, delete "band downlink available,", and insert --or a specific carrier--

In Claim 1: Column 44, Line 2, delete "on the licensed band", and insert --in the--

In Claim 11: Column 45, Line 9, delete "or, when there is a licensed band downlink available,", and insert --for a specific carrier--

In Claim 11: Column 45, Line 12, delete "on the licensed band", and insert --in the--

Signed and Sealed this
Twelfth Day of November, 2024

Katherine Kelly Vidal
*Director of the United States Patent and Trademark Office*